US006710935B2

United States Patent
Morooka

(10) Patent No.: US 6,710,935 B2
(45) Date of Patent: Mar. 23, 2004

(54) ZOOM OPTICAL SYSTEM AND CAMERA USING THE SAME

(75) Inventor: Masaru Morooka, Hachioji (JP)

(73) Assignee: Olympus Corporation, Tokyo (JP)

( * ) Notice: Subject to any disclaimer, the term of this patent is extended or adjusted under 35 U.S.C. 154(b) by 20 days.

(21) Appl. No.: 10/292,247

(22) Filed: Nov. 12, 2002

(65) Prior Publication Data

US 2003/0142411 A1 Jul. 31, 2003

(30) Foreign Application Priority Data

Nov. 14, 2001  (JP) ........................................ 2001-348508

(51) Int. Cl.$^7$ ............................................... G02B 15/14
(52) U.S. Cl. ........................................ 359/689; 359/683
(58) Field of Search ................................ 359/683, 689

(56) References Cited

FOREIGN PATENT DOCUMENTS

| JP | 11-271615 | 10/1999 |
|---|---|---|
| JP | 2000-275524 | 10/2000 |
| JP | 2000-298236 | 10/2000 |
| JP | 2001-004921 | 1/2001 |
| JP | 2001-281548 | 10/2001 |

*Primary Examiner*—Scott J. Sugarman
(74) *Attorney, Agent, or Firm*—Hogan & Hartson LLP

(57) ABSTRACT

A zoom optical system comprises, in order from an object side, a first lens unit having positive refractive power, a second lens unit having positive refractive power, and a third lens unit having negative refractive power. A magnification is changed from a wide-angle position to a telephoto position by moving the lens units toward the object side so as to widen an airspace between the first lens unit and the second lens unit and narrow an airspace between the second lens unit and the third lens unit. The zoom optical system satisfies the following conditions:

$0.5 < L_T/f_T < 0.8$ $0.5 < f_{G1}/f_W < 1.45$ $0.8 < f_{G2}/f_W < 1.2$ $0.4 < |f_{G3}/f_W| < 0.5$ where $f_W$ represents a focal length of the zoom optical system at the wide-angle position, $f_T$ represents a focal length of the zoom optical system at the telephoto position, $L_T$ represents a distance as measured from a most object side surface to an image surface on an optical axis at the telephoto position, $f_{G1}$ represents a focal length of the first lens unit, $f_{G2}$ represents a focal length of the second lens unit, and $f_{G3}$ represents a focal length of the third lens unit.

20 Claims, 26 Drawing Sheets

ZOOM OPTICAL SYSTEM AND CAMERA USING THE SAME

BACKGROUND OF THE INVENTION

1. Field of the Invention

The present invention generally relates to zoom optical systems that are used for photographing cameras and in particular in lens shutter cameras, and cameras equipped with such a zoom optical system.

2. Description of Related Art

In recent years, lens shutter cameras equipped with a zoom lens have become popular. In particular, cameras with a zoom ratio of 3 or greater are desired by the users.

Also, even though lens shutter cameras may have photographing lenses with a high zoom ratio, the cameras are desired to be small and light. For this reason, reduction of the diameter of lenses and the total length of lenses in the optical system has become an important objective for miniaturization of cameras.

To achieve such an object, optical systems of a variety of types have conventionally been proposed. Among those optical systems, optical systems of the type that can achieve miniaturization with a relatively simple structure and that have been proposed include a zoom optical system equipped with three moveable lens units, which is composed of a first lens unit with positive refractive power, a second lens unit with positive refractive power and a third lens unit with negative refractive power.

Although the conventional zoom optical systems have a relatively small telephoto ratio of about 0.8, the total length of the lens system at a wide-angle position is large. Accordingly, the diameter of the first lens unit and the third lens unit is large, and therefore they are not suitable for miniaturization of cameras.

Also, in the aforementioned zoom optical systems, an aperture stop is disposed within the second lens unit. As a result, the zoom optical systems may be substantially affected by decentration of each of the lens components among which the aperture stop is placed.

Furthermore, since the aforementioned zoom optical systems need a plurality of lens barrels among which a shutter is placed, large errors would occur in assembling the optical systems. Accordingly, there are problems in that deteriorations of the performance would likely occur.

Among the aforementioned conventional zoom optical systems, an attempt is made to achieve the size reduction and reduction of the number of lenses by effectively utilizing aspherical surfaces and reducing the number of lenses in the second lens unit with positive refractive power. However, while the number of lenses in the second lens unit may be reduced, the aspherical surfaces alone cannot sufficiently correct the aberration in the second lens unit, such that the influences of decentration of lens components in the second lend unit become greater. Furthermore, the first lens unit is designed to generate aberration in order to compensate for the influence. Accordingly, the influences of decentration of lens components in the first lens unit and the second lens unit become greater. Consequently, there are problems in that deteriorations of the performance due to errors in assembly would become greater.

SUMMARY OF THE INVENTION

The present invention has been made in view of the problems described above.

In accordance with an aspect of the present invention, a zoom optical system comprises, in order from an object side: a first lens unit having positive refractive power; a second lens unit having positive refractive power; and a third lens unit having negative refractive power, wherein a magnification is changed from a wide-angle position to a telephoto position by moving the lens units toward the object side so as to widen an airspace between the first lens unit and the second lens unit and narrow an airspace between the second lens unit and the third lens unit, and wherein the zoom optical system satisfies the following conditions:

$$0.5 < L_T/f_T < 0.8$$

$$0.5 < f_{G1}/f_W < 1.45$$

$$0.8 < f_{G2}/f_W < 1.2$$

$$0.4 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, a reference symbol $f_{G2}$ represents a focal length of the second lens unit, and a reference symbol $f_{G3}$ represents a focal length of the third lens unit.

Another aspect of the present invention pertains to a zoom optical system comprising, in order from an object side: a first lens unit having positive refractive power; a second lens unit having positive refractive power; a third lens unit having negative refractive power; and an aperture stop disposed on an image side of the second lens unit, wherein a magnification is changed from wide-angle position to a telephoto position by moving the lens units toward the object side so as to widen an airspace between the first lens unit and the second lens unit and narrow an airspace between the second lens unit and the third lens unit, and wherein the zoom optical system satisfies the following conditions:

$$0.5 < L_T/f_T < 0.8$$

$$0.5 < f_{G1}/f_W < 1.35$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, and a reference symbol $f_{G3}$ represents a focal length of the third lens unit.

Another aspect of the present invention pertains to a zoom optical system comprising, in order from an object side: a first lens unit having positive refractive power; a second lens unit having positive refractive power; a third lens unit having negative refractive power; and an aperture stop disposed on an image side of the second lens unit, wherein a magnification is changed from a wide-angle position to a telephoto position by moving the lens units toward the object side so as to widen an airspace between the first lens unit and the second lens unit and narrow an airspace between the second lens unit and the third lens unit, wherein the second lens unit comprises a bi-concave lens element disposed on the most object side and at least two positive lens elements, and the second lens unit comprises two lens components or three lens components in all the second lens unit, and wherein the zoom optical system satisfies the following conditions:

$$0.5 < L_T/f_T < 0.8$$

$$0.2 < |f_{G3}/f_W| < 0.48$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, and a reference symbol $f_{G3}$ represents a focal length of the third lens unit.

In accordance with another aspect of the present invention, a camera comprises; a photographic system comprising any one of the zoom optical systems described above; and a field stop for determining an image area located on an image side of the zoom optical system.

Furthermore, in accordance with still another aspect of the present invention, a zoom optical system comprises, in order from an object side: a first lens unit having positive refractive power; a second lens unit having positive refractive power; and a third lens unit having negative refractive power, wherein a magnification is changed from a wide-angle position to a telephoto position by moving the lens units toward the object side so as to is widen an airspace between the first lens unit and the second lens unit and narrow an airspace between the second lens unit and the third lens unit, wherein the first lens unit consists of, in order from the object side, a negative meniscus lens component having a concave surface facing toward the object side and a bi-convex lens component, and wherein the zoom optical system satisfies the following conditions:

$$0.5 < L_T/f_T < 0.8$$

$$0.5 < f_{G1}/f_W < 1.5$$

$$0.8 < f_{G2}/f_W < 1.2$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, a reference symbol $f_{G2}$ represents a focal length of the second lens unit, and a reference symbol $f_{G3}$ represents a focal length of the third lens unit.

In accordance with another aspect of the present invention, a zoom optical system comprises, in order from an object side: a first lens unit having positive refractive power; a second lens unit having positive refractive power; a third lens unit having negative refractive power; and an aperture stop disposed on an image side of the second lens unit, wherein a magnification is changed from wide-angle position to a telephoto position by moving the lens units toward the object side so as to widen an airspace between the first lens unit and the second lens unit and narrow an airspace between the second lens unit and the third lens unit, wherein the first lens unit consists of, in order from the object side, a negative meniscus lens component having a concave surface facing toward the object side and a bi-convex lens component, and wherein the zoom optical system satisfies the following conditions:

$$0.5 < L_T/f_T < 0.8$$

$$0.5 < f_{G1}/f_W < 1.5$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, and a reference symbol $f_{G3}$ represents a focal length of the third lens unit.

In accordance with still another aspect of the present invention, a zoom optical system may comprise, in order from an object side: a first lens unit having positive refractive power; a second lens unit having positive refractive power; a third lens unit having negative refractive power; and an aperture stop disposed on an image side of the second lens unit, wherein a magnification is changed from a wide-angle position to a telephoto position by moving the lens units toward the object side so as to widen an airspace between the first lens unit and the second lens unit and narrow an airspace between the second lens unit and the third lens unit, wherein the first lens unit consists of, in order from the object side, a negative meniscus lens component having a concave surface facing toward the object side and a bi-convex lens component, wherein the second lens unit comprises a bi-concave lens element disposed on the most object side and at least two positive lens elements, and the second lens unit comprises two lens components or three lens components in all the second lens unit, and wherein the zoom optical system satisfies the following conditions:

$$0.5 < L_T/f_T < 0.8$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, and a reference symbol $f_{G3}$ represents a focal length of the third lens unit.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 1(a), 1(b) and 1(c) show cross-sectional views of a lens structure of a zoom optical system along an optical axis in accordance with an embodiment 1 of the present invention, wherein FIG. 1(a) shows a state of the lens structure in a wide-angle position, FIG. 1(b) shows a state of the lens structure in an intermediate focal length, and FIG. 1(c) shows a state of the lens structure in a telephoto position.

FIGS. 5(a), 5(b) and 5(c) show cross-sectional views of a lens structure of a zoom optical system along an optical axis in accordance with an embodiment 2 of the present invention, wherein FIG. 5(a) shows a state of the lens structure in a wide-angle position, FIG. 5(b) shows a state of the lens structure in an intermediate focal length, and FIG. 5(c) shows a state of the lens structure in a telephoto position.

FIGS. 9(a), 9(b) and 9(c) show cross-sectional views of a lens structure of a zoom optical system along an optical axis in accordance with an embodiment 3 of the present invention, wherein FIG. 9(a) shows a state of the lens structure in a wide-angle position, FIG. 9(b) shows a state of the lens structure in an intermediate focal length, and FIG. 9(c) shows a state of the lens structure in a telephoto position.

FIGS. 13(a), 13(b) and 13(c) show cross-sectional views of a lens structure of a zoom optical system along an optical axis in accordance with an embodiment 4 of the present invention, wherein FIG. 13(a) shows a state of the lens structure in a wide-angle position, FIG. 13(b) shows a state of the lens structure in an intermediate focal length, and FIG. 13(c) shows a state of the lens structure in a telephoto position.

FIGS. 17(a), 17(b) and 17(c) show cross-sectional views of a lens structure of a zoom optical system along an optical axis in accordance with an embodiment 5 of the present invention, wherein FIG. 17(a) shows a state of the lens structure in a wide-angle position, FIG. 17(b) shows a state of the lens structure in an intermediate focal length, and FIG. 17(c) shows a state of the lens structure in a telephoto position.

FIGS. 21(a), 21(b) and 21(c) show cross-sectional views of a lens structure of a zoom optical system along an optical axis in accordance with an embodiment 6 of the present invention, wherein FIG. 21(a) shows a state of the lens structure in a wide-angle position, FIG. 21(b) shows a state of the lens structure in an intermediate focal length, and FIG. 21(c) shows a state of the lens structure in a telephoto position.

DETAILED DESCRIPTION OF THE PREFERRED EMBODIMENTS

Figure 1:
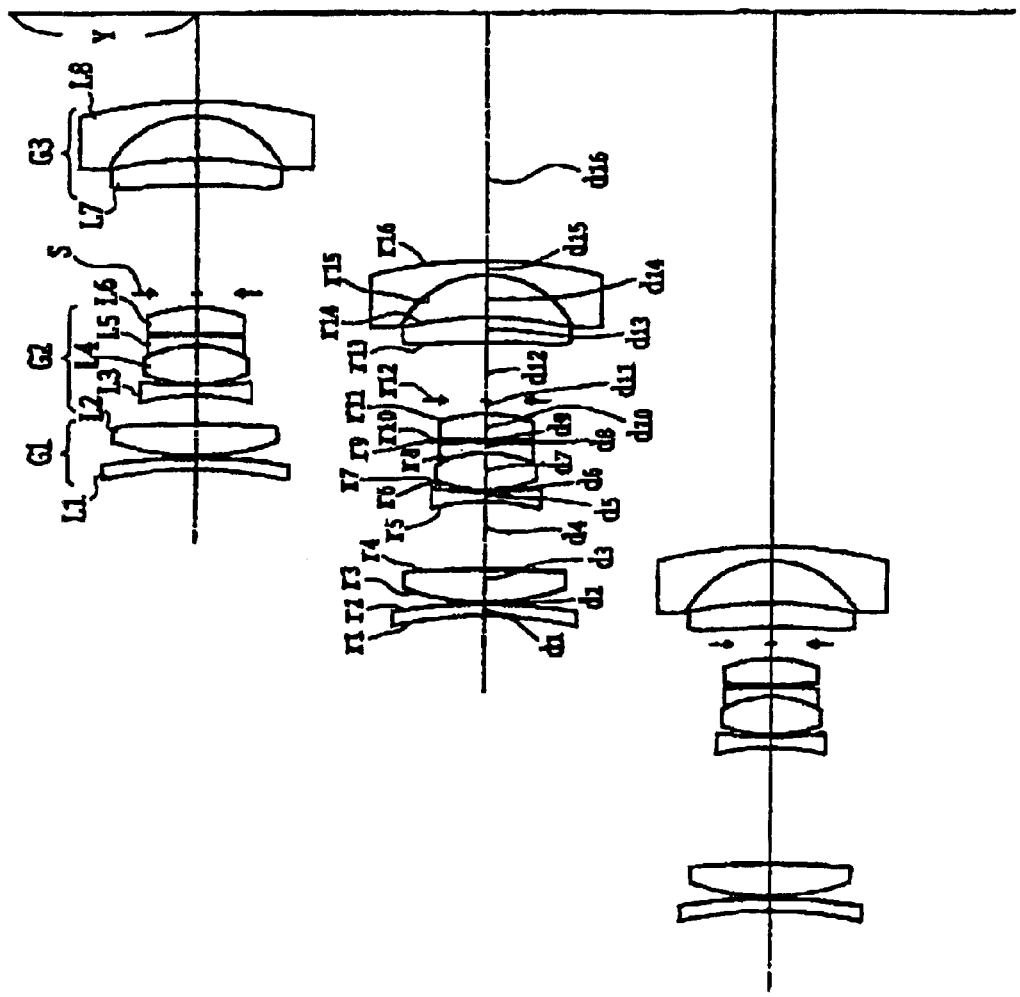

A zoom optical system in accordance with a first embodiment of the present invention includes, in order from an object side, a first lens unit having positive refractive power, a second lens unit having positive refractive power, and a third lens unit having negative refractive power. In one aspect of the present invention, a magnification is changed from a wide-angle position to a telephoto position by moving the lens units toward the object side so as to widen an airspace between the first lens unit and the second lens unit and narrow an airspace between the second lens unit and the third lens unit. In the first embodiment, the zoom optical system satisfies the following conditional formulas (1), (2'), (3) and (4'):

$$0.5 < L_T/f_T < 0.8 \quad (1)$$

$$0.5 < f_{G1}/f_W < 1.45 \quad (2')$$

$$0.8 < f_{G2}/f_W < 1.2 \quad (3)$$

$$0.4 < |f_{G3}/f_W| < 0.5 \quad (4')$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, a reference symbol $f_{G2}$ represents a focal length of the second lens unit, and a reference symbol $f_{G3}$ represents a focal length of the third lens unit.

A zoom optical system in accordance with a second embodiment of the present invention comprises, in order from an object side, a first lens unit having positive refractive power, a second lens unit having positive refractive power, a third lens unit having negative refractive power, and an aperture stop disposed on an image side of the second lens unit. A magnification is changed from wide-angle position to a telephoto position by moving the lens units toward the object side so as to widen an airspace between the first lens unit and the second lens unit and narrow an airspace between the second lens unit and the third lens unit. In the zoom optical system in the second embodiment, the zoom optical system satisfies the following conditional formulas (1), (2") and (4):

$$0.5 < L_T/f_T < 0.8 \quad (1)$$

$$0.5 < f_{G1}/f_W < 1.35 \quad (2")$$

$$0.2 < |f_{G3}/f_W| < 0.5 \quad (4)$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, and a reference symbol $f_{G3}$ represents a focal length of the third lens unit.

A zoom optical system in accordance with a third embodiment of the present invention comprises, in order from an object side, a first lens unit having positive refractive power, a second lens unit having positive refractive power, a third lens unit having negative refractive power, and an aperture stop disposed on an image side of the second lens unit. A magnification is changed from a wide-angle position to a telephoto position by moving the lens units toward the object side so as to widen an airspace between the first lens unit and the second lens unit and narrow an airspace between the second lens unit and the third lens unit. In one aspect, the second lens unit comprises a bi-concave lens element disposed on the most object side and at least two positive lens elements, wherein the second lens unit comprises two lens components or three lens components in all the second lens unit. The zoom optical system in accordance with the third embodiment satisfies the following conditional formulas (1) and (4"):

$$0.5 < L_T/f_T < 0.8 \quad (1)$$

$$0.2 < |f_{G3}/f_W| < 0.48 \quad (4")$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, and a reference symbol $f_{G3}$ represents a focal length of the third lens unit. A lens component means a lens unit that does not include an airspace and may mean a single lens component or a cemented lens component.

Also, in accordance with a fourth embodiment of the present invention, among the zoom optical systems according to the first through third embodiments, the following conditional formula (7) is satisfied:

$$2.9 < f_T/f_W < 5.0 \quad (7)$$

where the reference symbol $f_W$ represents a focal length of the zoom optical system at the wide-angle position, and the reference symbol $f_T$ represents a focal length of the zoom optical system at the telephoto position.

In accordance with a fifth embodiment of the present invention, a camera is equipped with a photographic system including the zoom optical system according to any one of the first through third embodiments, and a field stop for determining an image area located on an image side of the zoom optical system.

Also, in accordance with a sixth embodiment of the present invention, the camera equipped with the zoom optical system of the fifth embodiment satisfies the following conditional formula (6):

$$1.3 < f_W/Y < 2 \quad (6)$$

where the reference symbol $f_W$ represents a focal length of the zoom optical system at the wide-angle position, and a reference symbol Y represents a maximum image height, wherein, when a shape of the field stop is variable, the maximum image height represents a maximum value in a range of variable image heights.

Furthermore, a zoom optical system in accordance with a seventh embodiment of the present invention comprises, in order from an object side, a first lens unit having positive refractive power, a second lens unit having positive refractive power, and a third lens unit having negative refractive power. In this zoom optical system, a magnification is changed from a wide-angle position to a telephoto position by moving the lens units toward the object side so as to widen an airspace between the first lens unit and the second lens unit and narrow an airspace between the second lens unit and the third lens unit. In one aspect, the first lens unit consists of, in order from the object side, a negative meniscus lens component having a concave surface facing toward the object side and a bi-convex lens component. The zoom optical system of the seventh embodiment satisfies the following conditional formulas (1), (2), (3) and (4):

$$0.5 < L_T/f_T < 0.8 \quad (1)$$

$$0.5 < f_{G1}/f_W < 1.5 \quad (2)$$

$$0.8 < f_{G2}/f_W < 1.2 \quad (3)$$

$$0.2 < |f_{G3}/f_W| < 0.5 \quad (4)$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, a reference symbol $f_{G2}$ represents a focal length of the second lens unit, and a reference symbol $f_{G3}$ represents a focal length of the third lens unit.

Also, a zoom optical system in accordance with an eighth embodiment of the present invention comprises, in order from an object side, a first lens unit having positive refractive power, a second lens unit having positive refractive power, a third lens unit having negative refractive power, and an aperture stop disposed on an image side of the second lens unit, wherein a magnification is changed from wide-angle position to a telephoto position by moving the lens units toward the object side so as to widen an airspace between the first lens unit and the second lens unit and narrow an airspace between the second lens unit and the third lens unit. In one aspect, the first lens unit consists of, in order from the object side, a negative meniscus lens component having a concave surface facing toward the object side and a bi-convex lens component. The zoom optical system of the eighth embodiment satisfies the following conditional formulas (1), (2) and (4):

$$0.5 < L_T/f_T < 0.8 \quad (1)$$

$$0.5 < f_{G1}/f_W < 1.5 \quad (2)$$

$$0.2 < |f_{G3}/f_W| < 0.5 \quad (4)$$

Also, a zoom optical system in accordance with another embodiment of the present invention comprises, in order from an object side, a first lens unit having positive refractive power, a second lens unit having positive refractive power, a third lens unit having negative refractive power, and an aperture stop disposed on an image side of the second lens unit, wherein a magnification is changed from a wide-angle position to a telephoto position by moving the lens units toward the object side so as to widen an airspace between the first lens unit and the second lens unit and narrow an airspace between the second lens unit and the third lens unit. In one aspect, the first lens unit consists of, in order from the object side, a negative meniscus lens component having a concave surface facing toward the object side and a bi-convex lens component, wherein the second lens unit comprises a bi-concave lens element disposed on the most object side and at least two positive lens elements, and the second lens unit comprises two lens components or three lens components in all the second lens unit. The zoom optical system of the embodiment thus structured satisfies the following conditional formulas (1) and (4):

$$0.5 < L_T/f_T < 0.8 \quad (1)$$

$$0.2 < |f_{G3}/f_W| < 0.5 \quad (4)$$

As described above, the first embodiment of the present invention is composed of, in order from an object side, a first lens unit having positive refractive power, a second lens unit having negative refractive power, and a third lens unit having positive refractive power. The first embodiment is applied to a zoom optical system, such as, for example, a three lens units zoom system, in which a magnification is changed from a wide-angle position to a telephoto position by moving the lens units toward the object side so as to widen an airspace between the first lens unit and the second lens unit and narrow an airspace between the second lens unit and the third lens unit. In the first embodiment, in order to shorten the total length of the lens system at the telephoto position while its zoom ratio is set at 3 or greater, the total refractive power of the positive first and second lens units and the refractive power of the negative third lens unit need to be appropriately strengthened. Accordingly, the refractive powers of the lens units are appropriately arranged to satisfy the conditional formulas (2), (3) and (4) while satisfying the conditional formula (1).

In particular, the first embodiment may satisfy the conditional formula (2') and the conditional formula (4'). As a result, the balance between the size of the zoom optical system and its optical performance can be optimized.

The conditional formula (1) specifies a telephoto ratio at the telephoto position. When the conditional formula (1) exceeds the lower limit value, the refractive power of each of the lens units becomes very much strengthened. As a result, although the total length of the lenses at the telephoto position becomes small, aberrations generated at each of the lens units become large, and therefore correction of aberrations along all positions for zooming becomes difficult. On the other hand, when the conditional formula (1) exceeds the upper limit value, the total length of the lenses at the telephoto position becomes large, and therefore it becomes difficult to miniaturize the camera.

The conditional formula (2) specifies an optimum refractive power of the first lens unit. When the conditional formula (2) exceeds the lower limit value, the refractive power of the first lens unit becomes strengthened, and the amount of movements at zooming of the first lens unit becomes small, which is advantageous to reduce the total length of the lenses at the telephoto position. However, since large aberrations are generated at the first lens unit, aberrations that cancel the aberrations at the first lens unit need to be generated at the second lens unit and the third lens unit. As a result, the decentration sensitivity of each of the lens units becomes large, and performance deteriorations would likely occur due to manufacturing errors.

On the other hand, when the conditional formula (2) exceeds the upper limit value, the refractive power of the first lens unit becomes weakened, and the amount of movements at zooming of the first lens unit becomes large. This makes the total length of the lenses at the telephoto position greater, and the miniaturization of the camera difficult. The first embodiment may satisfy the conditional formula (2') to thereby achieve a further shortening of the total length of the lenses.

The conditional formulas (3) and (4) specify optimum refractive powers of the second lens unit and the third lens unit, respectively. When the conditional formulas (3) and (4) exceed their respective lower limit values, the refractive powers of the second lens unit and the third lens unit become strengthened, and large aberrations are generated by the second lens unit and the third lens unit. Therefore, correction of aberrations along all positions for zooming becomes difficult.

On the other hand, the conditional formulas (3) and (4) exceed their respective upper limit values, the refractive powers of the second lens unit and the third lens unit become weakened, and, the amount of movements in zooming of the second lens unit and the third lens unit becomes large. Accordingly, since the composed length of lens barrels for moving the lens units has to be made longer, which makes the miniaturization of the camera difficult. The first embodiment may satisfy the conditional formula (4') to achieve better refractive powers.

The first embodiment may preferably satisfy the following conditional formula (6):

$$1.3 < f_W / Y < 2 \qquad (6)$$

where the reference symbol $f_W$ represents a focal length of the zoom optical system at the wide-angle position, and a reference symbol Y represents a maximum image height.

When the conditional formula (6) exceeds the lower limit value, large aberrations are generated at each of the lens units even when the refractive powers of the respective lens units are arranged in a manner to satisfy the conditional formulas (2)–(4), and thus correction of aberrations at the wide-angle position becomes difficult.

On the other hand, when the conditional formula (6) exceeds the upper limit value, the total length of the lenses at the wide-angle position becomes large, which poses a disadvantage in miniaturizing the camera.

The second embodiment of the present invention is composed of, in order from an object side, a first lens unit having positive refractive power, a second lens unit having positive refractive power, and a third lens unit having negative refractive power. The second embodiment is applied to a zoom optical system, such as, for example, a three lens units zoom system, in which a magnification is changed from wide-angle position to a telephoto position by moving the lens units toward the object side so as to widen an airspace between the first lens unit and the second lens unit and narrow an airspace between the second lens unit and the third lens unit.

Also, the second embodiment includes an aperture stop disposed on an image side of the second lens unit. By doing so, the height of the abaxial luminous flux at the third lens unit at the wide-angle position can be lowered, and thus the lens diameter of the third lens unit can be made smaller. Accordingly, the diameter of the lens barrels can be made smaller and thus the camera can be made smaller.

Also, in the second embodiment of the present invention, in order to shorten the total length of the lens system at the telephoto position while its zoom ratio is set at 3 or greater, the total refractive power of the positive first and second lens units and the refractive power of the negative third lens unit need to be appropriately strengthened. Accordingly, the refractive powers of the lens units are appropriately arranged to satisfy the conditional formulas (2) and (4) while satisfying the conditional formula (1). As a result, the balance between the size of the zoom optical system and its optical performance can be optimized.

Accordingly, the conditions (1), (2) and (4) may preferably be satisfied in order to miniaturize the lens system. In particular, the second embodiment of the present invention may satisfy the conditional formula (2'').

The conditional formula (1) specifies a telephoto ratio at the telephoto position. When the conditional formula (1) exceeds the lower limit value, the refractive power of each of the lens units becomes very much strengthened. As a result, although the total length of the lenses at the telephoto position becomes small, aberrations generated at each of the lens units become large, and therefore correction of aberrations along all positions for zooming becomes difficult. On the other hand, when the conditional formula (1) exceeds the upper limit value, the total length of the lenses at the telephoto position becomes large, and therefore it becomes difficult to miniaturize the camera.

The conditional formula (2) specifies an optimum refractive power of the first lens unit. When the conditional formula (2) exceeds the lower limit value, the refractive power of the first lens unit becomes strengthened, and the amount of movements at zooming of the first lens unit becomes small, which is advantageous to reduce the total length of the lenses at the telephoto position. However, since large aberrations are generated at the first lens unit, aberrations that cancel the aberrations at the first lens unit need to be generated at the second lens unit and the third lens unit. As a result, the decentration sensitivity of each of the lens units becomes large, and performance deteriorations would likely occur due to manufacturing errors.

On the other hand, when the conditional formula (2) exceeds the upper limit value, the refractive power of the first lens unit becomes weakened, and the amount of movements at zooming of the first lens unit becomes large. This makes the total length of the lenses at the telephoto position greater, and the miniaturization of the camera difficult. Preferably, the second embodiment may satisfy the conditional formula (2'') to thereby achieve a further shortening of the total length of the lenses.

The conditional formula (4) specifies optimum refractive powers of the third lens unit. When the conditional formula (4) exceeds the lower limit value, the refractive power of the third lens unit becomes strengthened, and large aberrations are generated by the third lens unit. Therefore, correction of aberrations along all positions for zooming becomes difficult.

On the other hand, when the conditional formula (4) exceeds the upper limit value, the refractive power of the third lens unit becomes weakened, and the amount of movements in zooming of the third lens unit becomes large. Accordingly, since the composed length of lens barrels for moving the lens units has to be made longer, which makes the miniaturization of the camera difficult.

Also, the second embodiment may preferably satisfy the following conditional formula (6):

$$1.3 < f_W / Y < 2 \qquad (6)$$

where the reference symbol $f_W$ represents a focal length of the zoom optical system at the wide-angle position, and a reference symbol Y represents a maximum image height.

When the conditional formula (6) exceeds the lower limit value, large aberrations are generated at each of the lens units even when the refractive powers of the respective lens units are arranged in a manner to satisfy the conditional formulas (2) and (4), and thus correction of aberrations at the wide-angle position becomes difficult.

On the other hand, when the conditional formula (6) exceeds the upper limit value, the total length of the lenses at the wide-angle position becomes large, which poses a disadvantage in miniaturizing the camera.

The third embodiment of the present invention is composed of, in order from an object side, a first lens unit having positive refractive power, a second lens unit having positive refractive power, and a third lens unit having negative refractive power. The third embodiment is applied to a zoom optical system, such as, for example, a three lens units zoom system, in which a magnification is changed from wide-angle position to a telephoto position by moving the lens units toward the object side so as to widen an airspace between the first lens unit and the second lens unit and narrow an airspace between the second lens unit and the third lens unit.

Also, the third embodiment includes an aperture stop disposed on an image side of the second lens unit. By so doing, the height of the abaxial luminous flux at the third lens unit at the wide-angle position can be lowered, and thus the lens diameter of the third lens unit can be made smaller. Accordingly, the diameter of the lens barrels can be made smaller and thus the camera can be made smaller.

Furthermore, in the third embodiment, the second lens unit may preferably be composed of, from the object side, a bi-concave lens element and at least two positive lens elements, and the second lens unit may preferably be composed of two lens components or three lens components as a whole.

Also, in the zoom optical system in accordance with the third embodiment, the second lens unit may preferably be formed from a retrofocus type lens structure comprised, from the object side, a negative lens component and a positive lens component, thereby enabling the principal point of the second lens unit to be located closer to the image side. By composing the zoom optical system in this manner, a sufficient back focus can be secured at the wide-angle position, and the height of the abaxial luminous flux of the third lens unit is lowered.

When the refractive power of the second lens unit is strengthened to shorten the total length of the lenses at the telephoto position, the refractive power of the positive lens is strengthened, and large aberrations occur at the positive lens. Therefore, when the negative lens and the positive lens are composed of single lens elements, respectively, there is a problem in that the influence of decentration of the respective lens elements becomes large. In view of this problem, the positive lens may be composed of at least two positive lens elements, which can bear the aberrations occurred in the positive lens, such that the influence of decentration of the respective lenses in the second lens unit can be made smaller. Accordingly, the second lens unit may preferably be composed of, from the object side, one negative lens element and at least two positive lens elements.

Also, the negative lens element of the second lens unit on the most object side may be provided on its object side with a concave surface facing toward the object side. As a result, an appropriate negative distortion can be generated, and the positive distortion of the entire lens system can be corrected. Also, the negative lens element of the second lens unit on the most object side may be provided on its image side with a convex surface facing toward the object side. Such a lens structure is preferably for correction of spherical aberration and coma of the second lens unit. Accordingly, the negative lens element of the second lens unit on the most object side may preferably be a bi-concave lens element.

When the refractive power of the second lens unit is strengthened to shorten the total length of the lens system at the telephoto position, large chromatic aberration occurs at the second lens unit. For this reason, when the second lens unit is composed of, from the object side, one bi-concave negative lens element and two positive lens elements, a cemented lens component may preferably be used for correction of chromatic aberration. In this case, the second lens unit may preferably be formed from two lens components that are composed of, from the object side, a negative lens component composed of a cemented lens component of a bi-concave negative lens element and a positive lens element, and a positive lens component composed of a positive single lens component or cemented lens component. Alternatively, the second lens unit may preferably be formed from three lens components that are composed of, from the object side, a negative lens component composed of a bi-concave negative lens element, a positive lens component composed of a positive single lens component or cemented lens component, and a positive lens component composed of a positive single lens component or cemented lens component. As a result, the structure of the second lens unit is simplified, and the total length of the lenses can be shortened.

Also, in the third embodiment of the present invention, in order to shorten the total length of the lens system at the telephoto position while its zoom ratio is set at 3 or greater, the total refractive power of the positive first and second lens units and the refractive power of the negative third lens unit need to be appropriately strengthened. Accordingly, the balance between the size of the zoom optical system and its optical performance may preferably be optimized for miniaturizing the lens system by appropriately arranging the refractive power of the third lens unit to satisfy the conditional formula (4) while satisfying the conditional formula (1).

In particular, the third embodiment of the present invention may satisfy the conditional formula (4").

The conditional formula (1) specifies a telephoto ratio at the telephoto position. When the conditional formula (1) exceeds the lower limit value, the refractive power of each of the lens units becomes very much strengthened. As a result, although the total length of the lenses at the telephoto position becomes small, aberrations generated at each of the lens units become large, and therefore correction of aberrations along all positions for zooming becomes difficult.

On the other hand, when the conditional formula (1) exceeds the upper limit value, the total length of the lenses at the telephoto position becomes large, and therefore it becomes difficult to miniaturize the camera.

The conditional formula (4) specifies optimum refractive powers of the third lens unit. When the conditional formula (4) exceeds the lower limit value, the refractive power of the third lens unit becomes strengthened, and large aberrations are generated at the third lens unit. Therefore, correction of aberrations along all positions for zooming becomes difficult.

On the other hand, when the conditional formula (4) exceeds the upper limit value, the refractive power of the third lens unit becomes weakened, and the amount of movements in zooming of the third lens unit becomes large. Accordingly, since the composed length of lens barrels for moving the lens units has to be made longer, which makes the miniaturization of the camera difficult.

The third embodiment of the present invention may satisfy the conditional formula (4") to achieve better refractive powers of the third lens unit.

Also, the third embodiment may preferably satisfy the following conditional formula (5):

$$0.2<|f_{G2N}|/f_W<0.8 \qquad (5)$$

where the reference symbol $f_W$ represents a focal length of the zoom optical system at the wide-angle position, and a reference symbol $f_{G2N}$ represents a focal length of the bi-concave lens element disposed on the most object side in the second lens unit.

When the conditional formula (5) exceeds the lower limit value, the refractive power of the bi-concave lens element on the most object side of the second lens unit is strengthened, and a large positive field curvature is generated. As a result, correction of the field curvature on the entire lens system becomes difficult.

On the other hand, when the conditional formula (5) exceeds the upper limit value, the refractive power of the bi-concave lens element on the most object side of the second lens unit becomes weakened. As a result, it becomes difficult to secure the back focus at the wide-angle position. As a consequence, the abaxial luminous flux of the third lens unit becomes higher, the lens diameter of the third lens unit becomes greater, and the lens barrel diameter becomes larger, which are in contradiction to miniaturization of the camera.

Also, the third embodiment of the present invention and other structures that may derive from the third embodiment, the following conditional formula (6) may be satisfied:

$$1.3 < f_W/Y < 2 \qquad (6)$$

where the reference symbol $f_W$ represents a focal length of the zoom optical system at the wide-angle position, and a reference symbol Y represents a maximum image height.

When the conditional formula (6) exceeds the lower limit value, large aberrations are generated at each of the lens units even when the refractive power of the third lens unit is arranged in a manner to satisfy the conditional formula (4), and thus correction of aberrations at the wide-angle position becomes difficult.

On the other hand, when the conditional formula (6) exceeds the upper limit value, the total length of the lenses at the wide-angle position becomes large, which poses a disadvantage in miniaturizing the camera.

Also, the second and third embodiments and structures that may derive from the second and third embodiments may preferably satisfy the following conditional formula (3):

$$0.8 < f_{G2}/f_W < 1.2 \qquad (3)$$

where the reference symbol $f_W$ represents a focal length of the zoom optical system at the wide-angle position, and a reference symbol $f_{G2}$ represents a focal length of the second lens unit.

The conditional formula (3) specifies optimum refractive powers of the second lens unit. When the conditional formula (3) exceeds the lower limit value, the refractive power of the second lens unit becomes strengthened, and large aberrations are generated at the second lens unit. Therefore, correction of aberrations along all positions for zooming becomes difficult.

On the other hand, when the conditional formula (3) exceeds the upper limit value, the refractive power of the second lens unit becomes weakened, and the amount of movements in zooming of the second lens unit becomes large. Accordingly, since the composed length of lens barrels for moving the lens units has to be made longer, which makes the miniaturization of the camera difficult.

Also, in the first through third embodiments of the present invention and structures that may derive from the first through third embodiments, the first lens unit may preferably be composed of a negative meniscus lens element having a concave surface facing toward the object side and a bi-convex lens element.

In the zoom optical system of the present invention, few chromatic aberration is generated at the first lens unit alone, and opposite chromatic aberrations are generated at the second lens unit and the third lens unit such that generation of chromatic aberration in the lens system as a whole is made small. This is because the negative lens element and the positive lens element in the first lens unit generate mutually opposite chromatic aberrations, such that the mutually opposite chromatic aberrations can be cancelled by each other. For this reason, chromatic aberration of each of the negative lens element and the positive lens element in the first lens unit does not need to be substantially small. Accordingly, the correction of chromatic aberration in each of the lens elements is alleviated, such that correction of aberrations other than chromatic aberration becomes easier, and the first lens unit can be composed of two lens elements of a negative lens element and a positive lens element.

Further, in order to secure a sufficient back focus at the wide-angle position, the position of principal point of the first lens unit needs to be placed closer to the image side. For this purpose, the negative lens element may preferably be in a meniscus configuration having a concave surface facing toward the object side.

On the other hand, the negative lens element in a meniscus configuration alone generates large aberration. In this respect, in accordance with the present invention, the negative lens element of the first lens unit is provided with a weak refractive power. As a result, even when the negative lens element is configured to have a concave surface facing toward the object side, the spherical aberration and coma of the negative lens element alone are small. Thus, by appropriately generating spherical aberration and coma at the positive lens element of the first lens unit, correction of aberrations in the entire system can be performed well. As a result, a sufficient back focus can be secured at the wide-angle position. Also, since the refractive power of the negative lens element can be weakened, impacts of manufacturing errors such as decentration of the negative lens element alone and deviations in the accuracy of surface configuration can be alleviated.

In order to shorten the total length of the lenses, the power of the first lens unit needs to be strengthened to some degree. For this purpose, the first lens unit may preferably be in a retrofocus type, which comprises, from the object side, a negative lens component and a positive lens component, thereby enabling to secure a back focus even though the refractive power of the first lens unit is strengthened to some degree. In the case, for correction of aberrations, the first lens unit may preferably be composed of, from the object side, a negative meniscus lens component having a concave surface facing toward the object side and a bi-convex lens component.

In accordance with the fourth embodiment of the present invention, the conditional formula (7) may be satisfied in the first through third embodiments described above.

When the conditional formula (7) exceeds the lower limit value, the zoom ratio does not reach about 3, and the zoom ratio does not exceed 3. On the other hand, when the conditional formula (7) exceeds the upper limit value, the number of lenses becomes too many and the cost becomes too high if correction of aberrations is performed through a three lens units system, and the target zoom ratio is to be attained.

The seventh, eighth and ninth embodiments may be composed in the following manner.

The seventh embodiment of the present invention is based on the composition of the first embodiment and satisfies the conditional formulas (1) through (4), which further specifies the composition of the first lens unit.

The eighth embodiment of the present invention is based on the composition of the second embodiment and satisfies the conditional formulas (1), (2) and (4), which further specifies the composition of the first lens unit.

Also, the ninth embodiment of the present invention is based on the composition of the third embodiment and satisfies the conditional formulas (1) and (4), which further specifies the composition of the first lens unit.

In the embodiments described above, the lower limit value of the conditional formula (1) may preferably be 0.6. Also, the upper limit value of the conditional formula (1) may be 0.75.

In the embodiments described above, the lower limit value of the conditional formula (2) may preferably be 0.9. Also, the upper limit value of is the conditional formula (2) may be 1.35.

In the embodiments described above, the lower limit value of the conditional formula (3) may preferably be 0.84. Also, the upper limit value of the conditional formula (3) may be 1.0.

In the embodiments described above, the lower limit value of the conditional formula (4) may preferably be 0.3. Also, the upper limit value of the conditional formula (4) may be 0.48.

In the embodiments described above, the lower limit value of the conditional formula (5) may preferably be 0.25. Also, the upper limit value of the conditional formula (5) may be 0.5.

In the embodiments described above, the lower limit value of the conditional formula (6) may preferably be 1.5. Also, the upper limit value of the conditional formula (6) may be 1.9.

In the embodiments described above, the conditional formulas may be specified independently from one another, or a plurality of the conditional formulas may be concurrently specified.

Also, the upper limit values and lower limit values can be specified in embodiments of the present invention that are to be described blew.

Embodiment examples of the present invention will be described below with reference to the accompanying drawings.

[Embodiment Example 1]

FIGS. 1(a), 1(b) and 1(c) show cross-sectional views of a lens structure of a zoom optical system along an optical axis in accordance with an embodiment example 1 of the present invention, wherein FIG. 1(a) shows a state of the lens structure in a wide-angle position, FIG. 1(b) shows a state of the lens structure in an intermediate focal length, and FIG. 1(c) shows a state of the lens structure in a telephoto position. The zoom optical system of the embodiment example 1 may generally be composed of three lens units.

Figure 2:
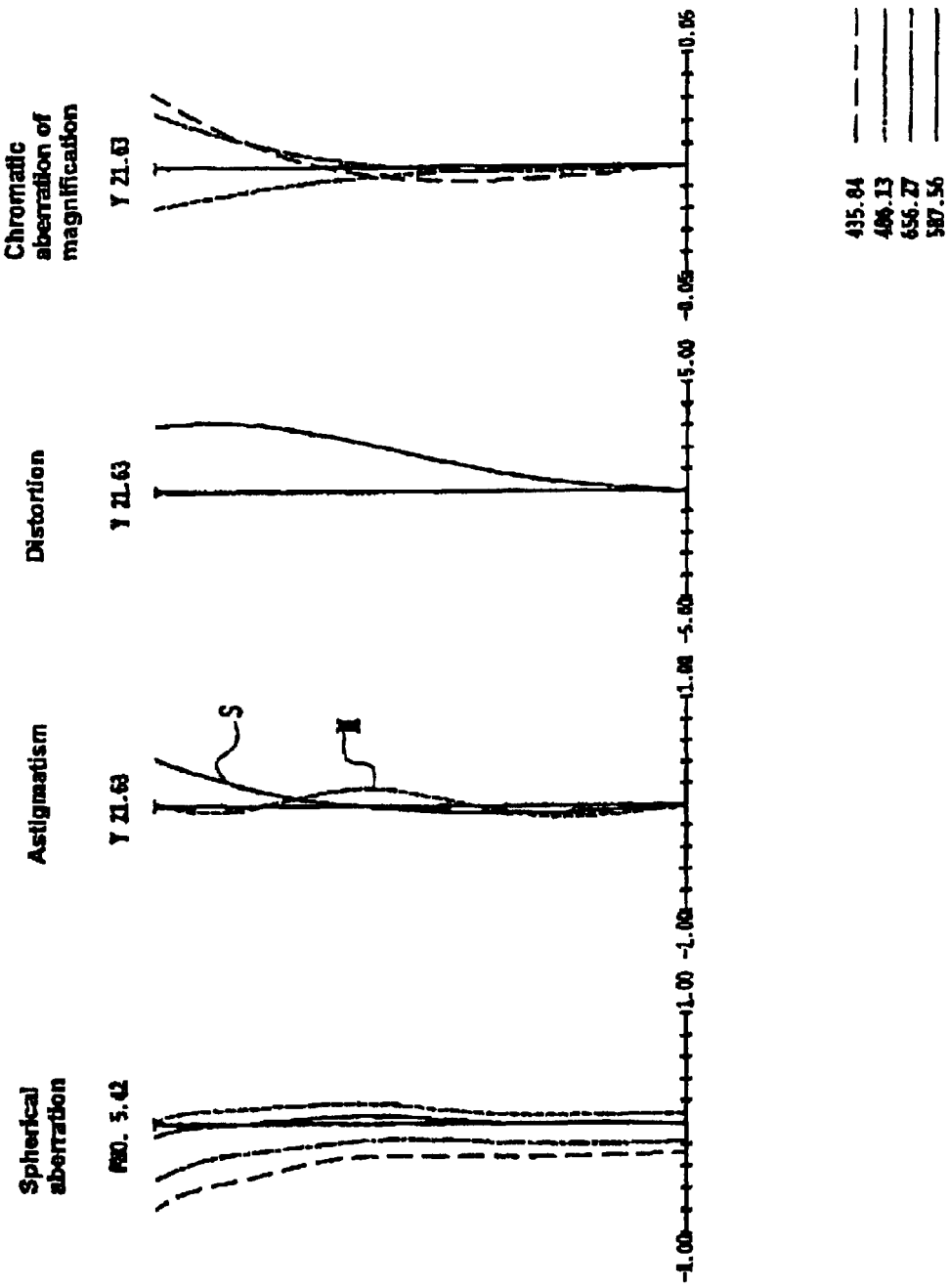
FIG. 2 shows curves visualizing aberration characteristics of spherical aberration, astigmatism, distortion, and chromatic aberration of magnification at the wide-angle position in the embodiment 1 of FIGS. 1(a), 1(b) and 1(c).
Figure 3:
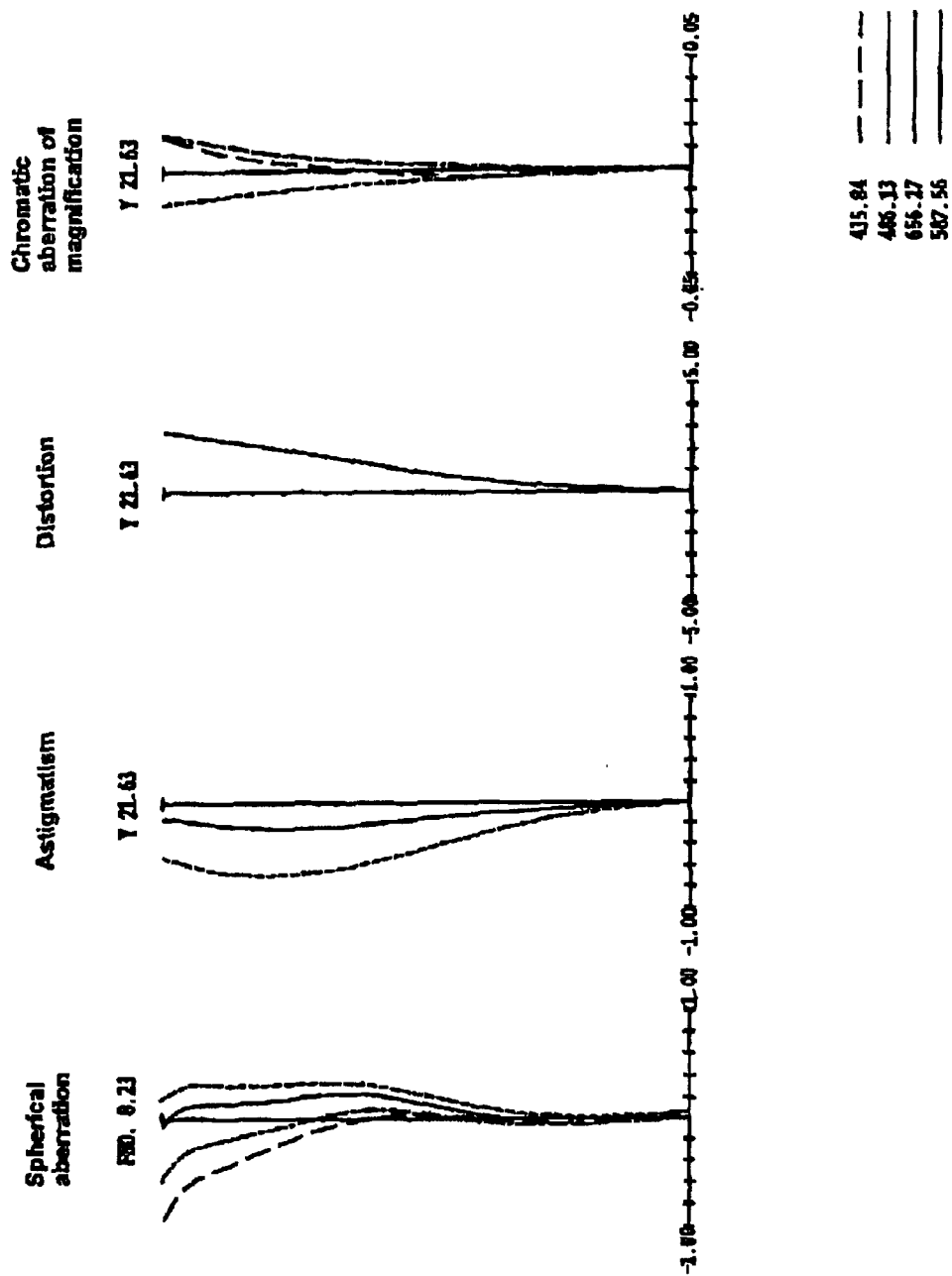
FIG. 3 shows curves visualizing aberration characteristics of spherical aberration, astigmatism, distortion, and chromatic aberration of magnification at the intermediate focal length in the embodiment 1.
Figure 4:
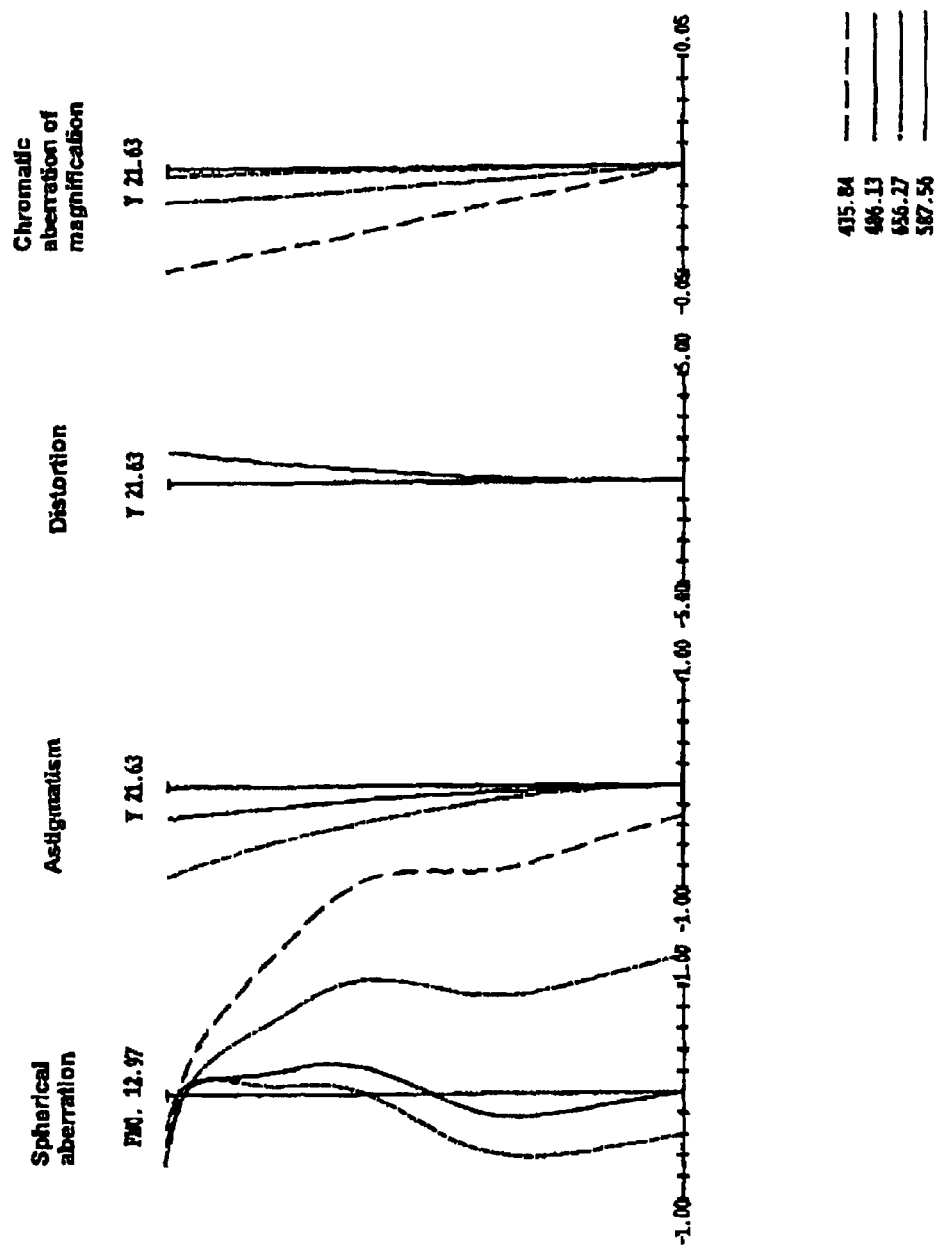
FIG. 4 shows curves visualizing aberration characteristics of spherical aberration, astigmatism, distortion, and chromatic aberration of magnification at the telephoto position in the embodiment 1.

FIGS. 2–4 show curves visualizing aberration characteristics of spherical aberration, astigmatism, distortion, and chromatic aberration of magnification in the embodiment example 1, wherein FIG. 2 shows curves at the wide-angle position, FIG. 3 shows curves at the intermediate focal length, and FIG. 4 shows curves at the telephoto position.

The zoom optical system of the embodiment example 1 includes a first lens unit G1, a second lens unit G2 and a third lens unit G3.

The first lens unit G1 is composed of, in order from an object side, a negative meniscus lens element L1 having a concave surface toward the object side and a bi-convex positive lens element L2.

The second lens unit G2 is composed of, in order from the object side, a bi-concave negative lens element L3, a cemented lens component of a bi-convex positive lens element L4 and a negative meniscus lens element L5 having a concave surface toward the object side, and a bi-convex lens element L6 having bi-aspheric surfaces.

The third lens unit G3 is composed of, in order from the object side, a positive meniscus lens element L7 with bi-aspheric surfaces having a concave surface toward the object side and a negative meniscus lens element L8 having a concave surface toward the object side.

When a magnification is changed from a wide-angle position to a telephoto position, the lens units G1–G3 move toward the object side in a manner that an airspace between the first lens unit G1 and the second lens unit G2 widens and an airspace between the second lens unit G2 and the third lens unit G3 narrows. An aperture stop S is provided on the image side of the second lens unit G2. The aperture stop S moves in a unitary fashion with the second lens unit G2 during a zooming operation.

Optical members that compose the zoom optical system of the embodiment example 1 have the following numerical value data. In the numerical value data of the embodiment example 1, $r_1, r_2, \ldots$ each represent a radius of curvature of each lens surface; $d_1, d_2, \ldots$ each represent a thickness of each lens element or an airspace; $n_{d1}, n_{d2}, \ldots$ each represent a d-line refractive index of each lens element; $v_{d1}, v_{d2}, \ldots$ each represent Abbe constant of each lens element; ω represents the half field angle of the system; and FNO. represents the F-number.

The shapes of aspheric surfaces can be expressed by the following formula:

$$z=(y^2/r)/[1+\{1-(1+K)(y/r)^2\}^{1/2}]+A_4 y^4+A_6 y^6+A_8 y^8+A_{10} y^{10}+A_{12} y^{12}$$

where a direction of an optical axis is taken as the z axis and a direction perpendicular to the optical axis is taken as the y axis, a reference symbol r represents a paraxial radius of curvature, reference symbols K designate conical coefficient, and reference symbols $A_4$, $A_6$, $A_8$, $A_{10}$ and $A_{12}$ designate aspherical surface coefficients.

It is noted that these reference symbols are commonly used for numerical value data in other embodiment examples to be described later.

| Numerical Value Data 1 | | | |
|---|---|---|---|
| $r_1 = -35.753$ | $d_1 = 1.10$ | $n_{d1} = 1.84666$ | $v_{d1} = 23.78$ |
| $r_2 = -58.685$ | $d_2 = 0.20$ | | |
| $r_3 = 18.954$ | $d_3 = 3.13$ | $n_{d3} = 1.49700$ | $v_{d3} = 81.54$ |
| $r_4 = -175.010$ | $d_4 = D4$ | | |
| $r_5 = -17.648$ | $d_5 = 1.00$ | $n_{d5} = 1.80100$ | $v_{d5} = 34.97$ |
| $r_6 = 26.484$ | $d_6 = 0.25$ | | |
| $r_7 = 12.283$ | $d_7 = 3.70$ | $n_{d7} = 1.60342$ | $v_{d7} = 38.03$ |
| $r_8 = -9.396$ | $d_8 = 1.00$ | $n_{d8} = 1.78800$ | $v_{d8} = 47.37$ |
| $r_9 = -69.229$ | $d_9 = 0.20$ | | |
| $r_{10} = 68.720$ (aspheric surface) | $d_{10} = 2.53$ | $n_{d10} = 1.58313$ | $v_{d10} = 59.38$ |
| $r_{11} = -12.673$ (aspheric surface) | $d_{11} = 1.45$ | | |
| $r_{12} = $ (stop) | $d_{12} = D12$ | | |
| $r_{13} = -61.346$ (aspheric surface) | $d_{13} = 2.43$ | $n_{d13} = 1.58423$ | $v_{d13} = 30.49$ |
| $r_{14} = -61.935$ | $d_{14} = 3.99$ | | |

-continued (aspheric surface)
$r_{15} = -9.200$  $d_{15} = 1.50$  $n_{d15} = 1.74100$  $v_{d15} = 52.64$
$r_{16} = -43.582$  $d_{16} = D16$ Aspherical Surface Coefficients 10-th surface
K = 0.000

$A_4 = -2.28617 \times 10^{-5}$  $A_6 = -3.74137 \times 10^{-6}$  $A_8 = 1.90958 \times 10^{-7}$
$A_{10} = 1.72012 \times 10^{-8}$  $A_{12} = -7.71287 \times 10^{-10}$ 11-th surface
K = 0.000

$A_4 = 1.66371 \times 10^{-4}$  $A_6 = 4.04733 \times 10^{-6}$  $A_8 = -1.14633 \times 10^{-6}$
$A_{10} = 1.09538 \times 10^{-7}$  $A_{12} = -3.09243 \times 10^{-9}$ 13-th surface
K = 0.000

$A_4 = 2.52886 \times 10^{-5}$  $A_6 = -7.48358 \times 10^{-6}$  $A_8 = 3.94190 \times 10^{-7}$
$A_{10} = -6.86191 \times 10^{-9}$  $A_{12} = 4.68976 \times 10^{-11}$ 14-th surface
K = 0.000

$A_4 = -1.25627 \times 10^{-4}$  $A_6 = -3.34252 \times 10^{-6}$  $A_8 = 1.26198 \times 10^{-7}$
$A_{10} = -1.60792 \times 10^{-9}$  $A_{12} = 9.54042 \times 10^{-12}$ Zoom Data

| | Wide-angle Position | Intermediate focal length | Telephoto position |
|---|---|---|---|
| Focal length | 38.999 | 66.097 | 120.865 |
| F N O. | 5.42 | 8.23 | 12.97 |
| ω(°) | 28.2 | 17.6 | 10.0 |
| D4 | 3.05 | 7.08 | 11.80 |
| D12 | 10.59 | 5.96 | 2.11 |
| D16 | 8.66 | 24.04 | 52.72 |

[Embodiment Example 2]

Figure 5:
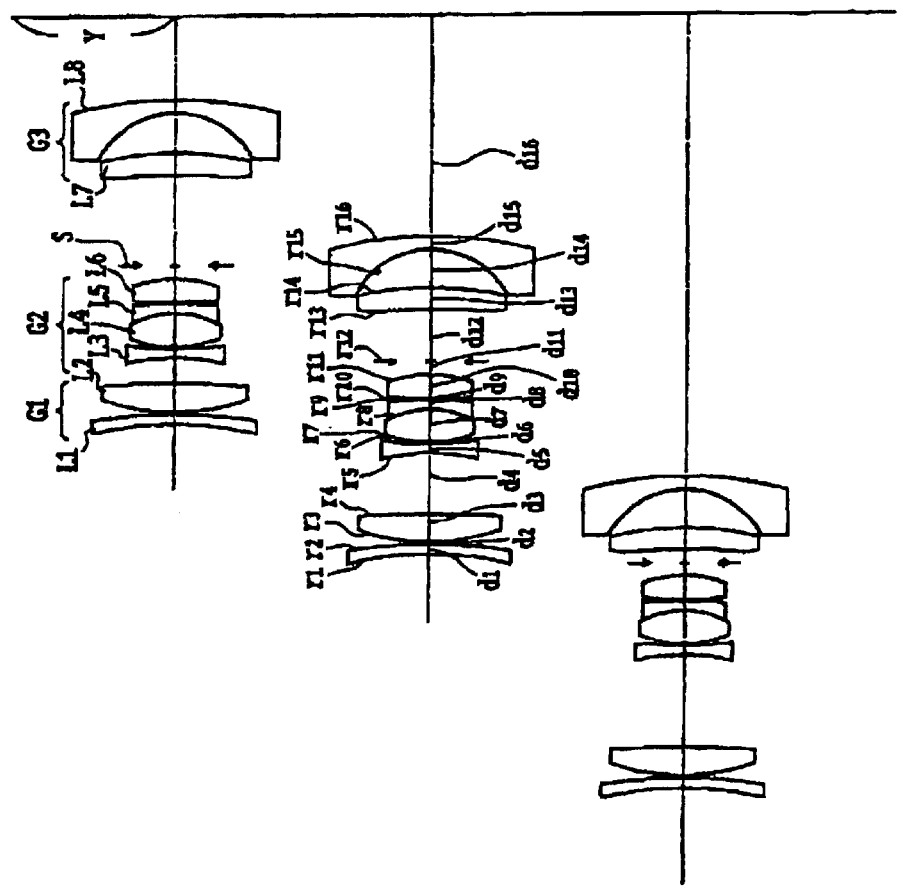

FIGS. 5(a), 5(b) and 5(c) show cross-sectional views of a lens structure of a zoom optical system along an optical axis in accordance with an embodiment example 2 of the present invention, wherein FIG. 5(a) shows a state of the lens structure in a wide-angle position, FIG. 5(b) shows a state of the lens structure in an intermediate focal length, and FIG. 5(c) shows a state of the lens structure in a telephoto position. The zoom optical system of the embodiment example 2 may generally be composed of three lens units.

Figure 6:
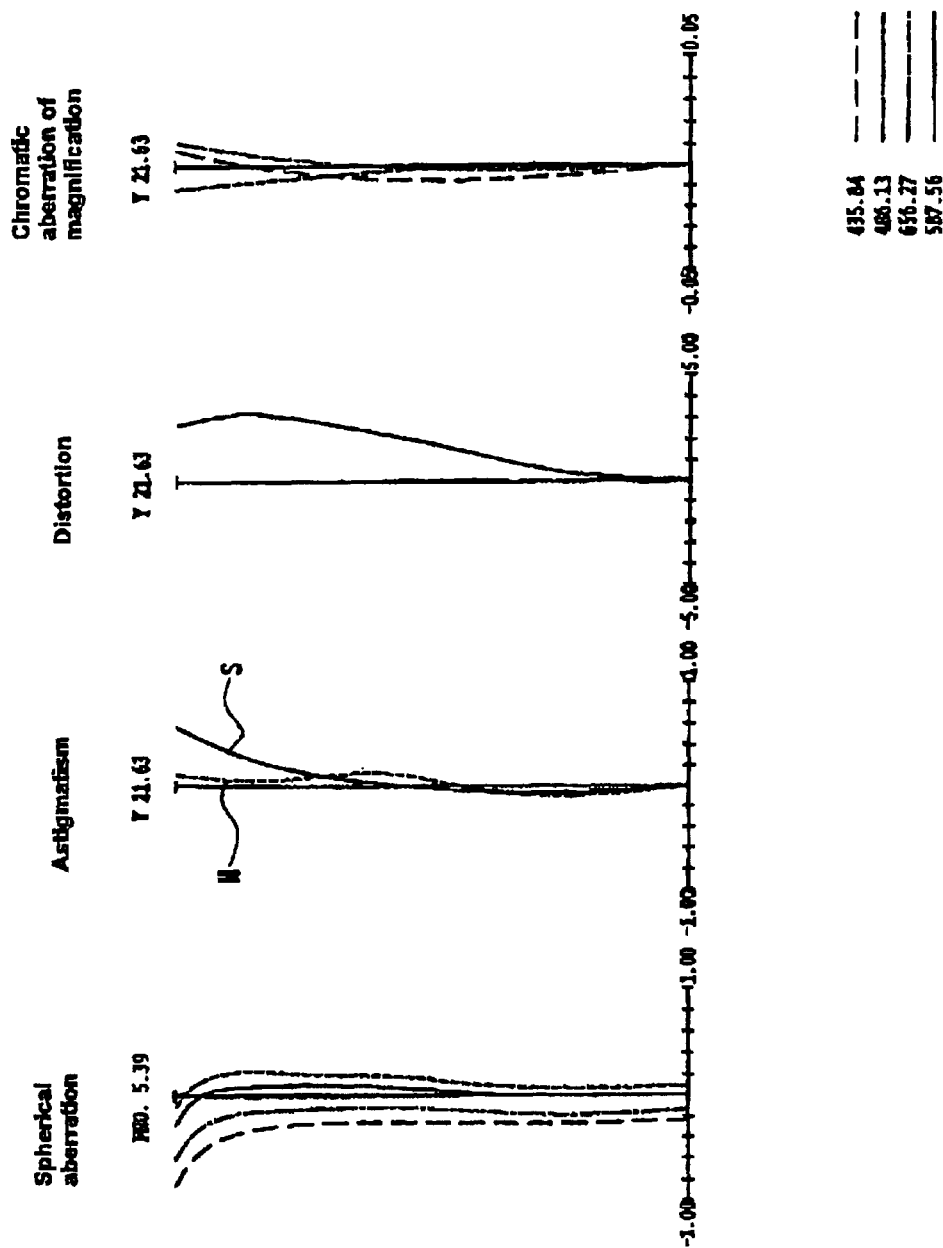
FIG. 6 shows curves visualizing aberration characteristics of spherical aberration, astigmatism, distortion, and chromatic aberration of magnification at the wide-angle position in the embodiment 2.
Figure 7:
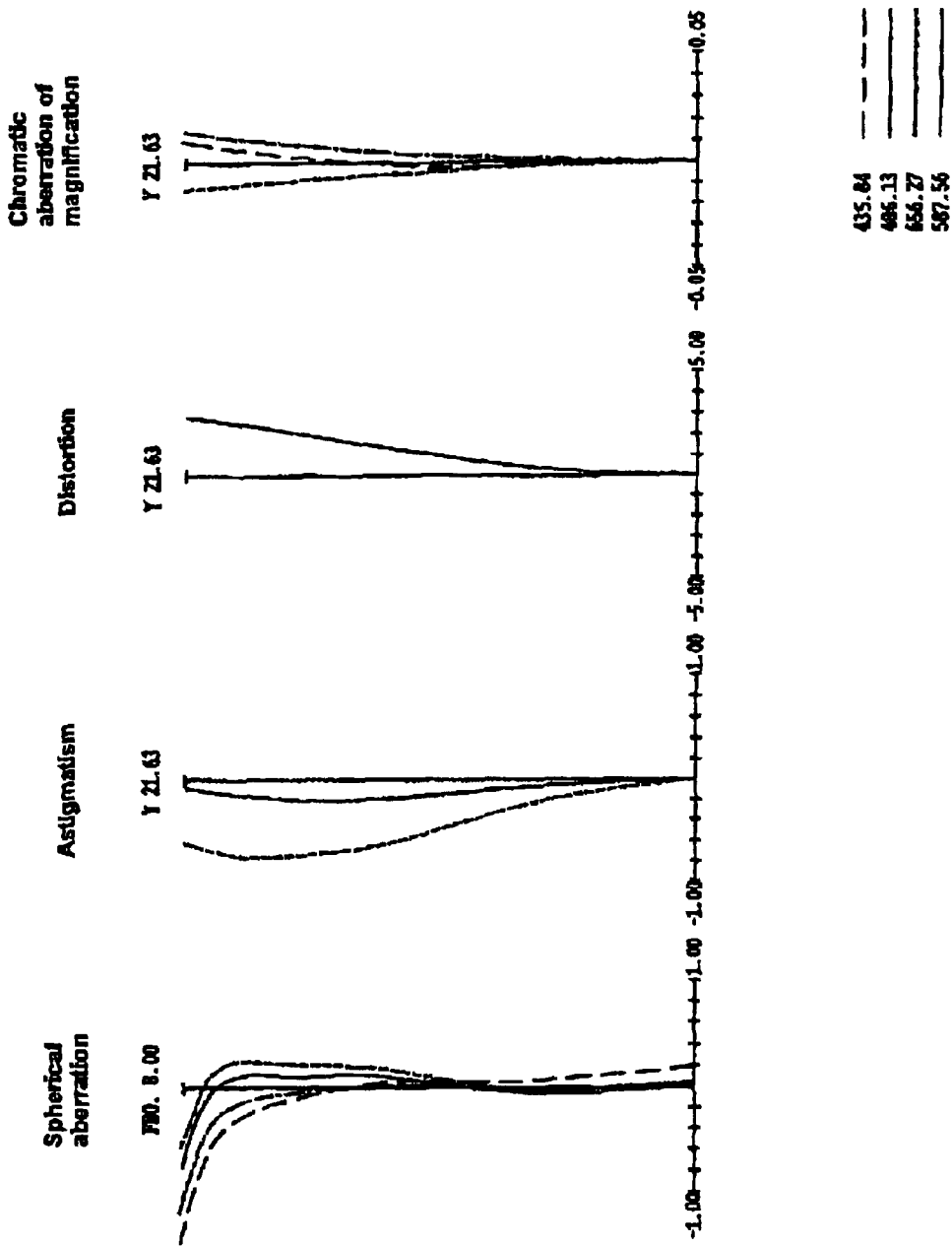
FIG. 7 shows curves visualizing aberration characteristics of spherical aberration, astigmatism, distortion, and chromatic aberration of magnification at the intermediate focal length in the embodiment 2.
Figure 8:
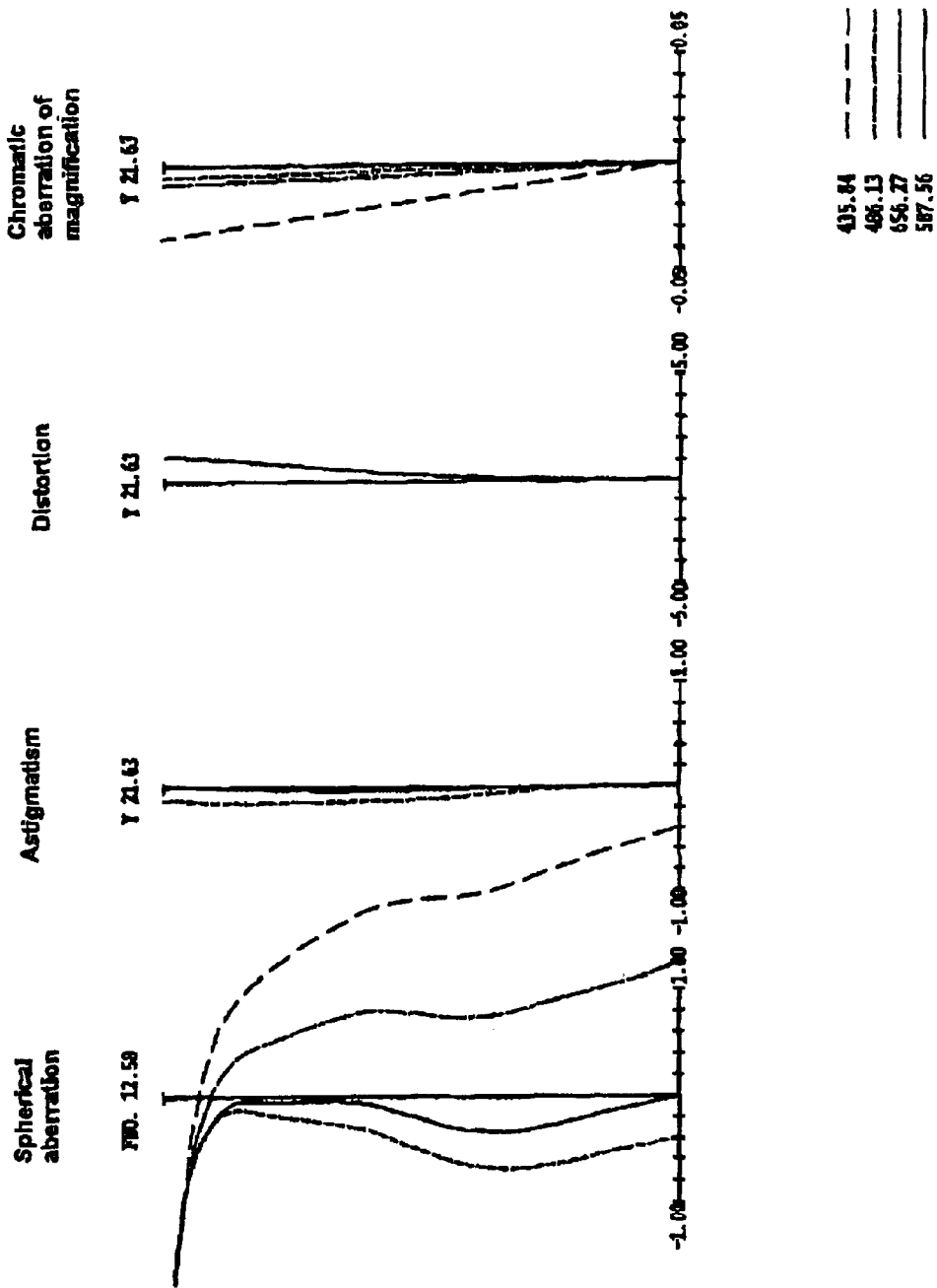
FIG. 8 shows curves visualizing aberration characteristics of spherical aberration, astigmatism, distortion, and chromatic aberration of magnification at the telephoto position in the embodiment 2.

FIGS. 6–8 show curves visualizing aberration characteristics of spherical aberration, astigmatism, distortion, and chromatic aberration of magnification in the embodiment example 2, wherein FIG. 6 shows curves at the wide-angle position, FIG. 7 shows curves at the intermediate focal length, and FIG. 8 shows curves at the telephoto position.

The zoom optical system of the embodiment example 2 includes a first lens unit G1, a second lens unit G2 and a third lens unit G3.

The first lens unit G1 is composed of, in order from an object side, a negative meniscus lens element L1 having a concave surface toward the object side and a bi-convex positive lens element L2.

The second lens unit G2 is composed of, in order from the object side, a bi-concave negative lens element L3, a cemented lens component of a bi-convex positive lens element L4 and a negative meniscus lens element L5 having a concave surface toward the object side, and a bi-convex lens element L6 having bi-aspheric surfaces.

The third lens unit G3 is composed of, in order from the object side, a positive meniscus lens element L7 with bi-aspheric surfaces having a concave surface toward the object side and a negative meniscus lens element L8 having a concave surface toward the object side.

When a magnification is changed from a wide-angle position to a telephoto position, the lens units G1–G3 move toward the object side in a manner that an airspace between the first lens unit G1 and the second lens unit G2 widens and an airspace between the second lens unit G2 and the third lens unit G3 narrows. An aperture stop S is provided on the image side of the second lens unit G2. The aperture stop S moves in a unitary fashion with the second lens unit G2 during a zooming operation.

Optical members that compose the zoom optical system of the embodiment example 2 have the following numerical value data.

Numerical Value Data 2

$r_1 = -35.525$  $d_1 = 1.00$  $n_{d1} = 1.84666$  $v_{d1} = 23.78$
$r_2 = -57.107$  $d_2 = 0.20$
$r_3 = 18.026$  $d_3 = 3.13$  $n_{d3} = 1.49700$  $v_{d3} = 81.54$
$r_4 = -313.711$  $d_4 = D4$
$r_5 = -16.589$  $d_5 = 1.00$  $n_{d5} = 1.80100$  $v_{d5} = 34.97$
$r_6 = 26.787$  $d_6 = 0.20$
$r_7 = 12.954$  $d_7 = 3.40$  $n_{d7} = 1.60342$  $v_{d7} = 38.03$
$r_8 = -10.075$  $d_8 = 1.00$  $n_{d8} = 1.78800$  $v_{d8} = 47.37$
$r_9 = -40.238$  $d_9 = 0.20$
$r_{10} = 68.571$  $d_{10} = 2.50$  $n_{d10} = 1.58313$  $v_{d10} = 59.38$
(aspheric surface)
$r_{11} = -14.119$  $d_{11} = 0.80$
(aspheric surface)
$r_{12} = $ (stop)  $d_{12} = D12$
$r_{13} = -71.996$  $d_{13} = 2.50$  $n_{d13} = 1.58423$  $v_{d13} = 30.49$
(aspheric surface)
$r_{14} = -72.817$  $d_{14} = 4.26$
(aspheric surface)
$r_{15} = -9.000$  $d_{15} = 1.50$  $n_{d15} = 1.74100$  $v_{d15} = 52.64$
$r_{16} = -39.797$  $d_{16} = D16$ Aspherical Surface Coefficients 10-th surface
K = 0.000

$A_4 = 1.27620 \times 10^{-5}$  $A_6 = -4.97238 \times 10^{-6}$  $A_8 = 1.26964 \times 10^{-6}$
$A_{10} = -7.72960 \times 10^{-8}$  $A_{12} = -1.86719 \times 10^{-9}$ 11-th surface
K = 0.000

$A_4 = 1.67908 \times 10^{-4}$  $A_6 = 4.54365 \times 10^{-6}$  $A_8 = -3.30046 \times 10^{-7}$
$A_{10} = 4.20568 \times 10^{-8}$  $A_{12} = 1.47647 \times 10^{-9}$ 13-th surface
K = 0.000

$A_4 = -1.51277 \times 10^{-6}$  $A_6 = -5.88937 \times 10^{-6}$  $A_8 = 3.27424 \times 10^{-7}$
$A_{10} = -5.75712 \times 10^{-9}$  $A_{12} = 4.01059 \times 10^{-11}$ 14-th surface
K = 0.000

$A_4 = -1.60937 \times 10^{-4}$  $A_6 = -2.12396 \times 10^{-6}$  $A_8 = 8.28497 \times 10^{-8}$
$A_{10} = -1.00913 \times 10^{-9}$  $A_{12} = 5.77901 \times 10^{-12}$ Zoom Data

| | Wide-angle Position | Intermediate focal length | Telephoto position |
|---|---|---|---|
| Focal length | 39.000 | 66.100 | 116.181 |
| F N O. | 5.39 | 8.00 | 12.58 |
| ω(°) | 28.3 | 17.6 | 10.4 |
| D4 | 3.03 | 7.82 | 11.29 |
| D12 | 10.68 | 5.90 | 2.42 |
| D16 | 8.76 | 23.71 | 50.77 |

[Embodiment Example 3]

Figure 9:
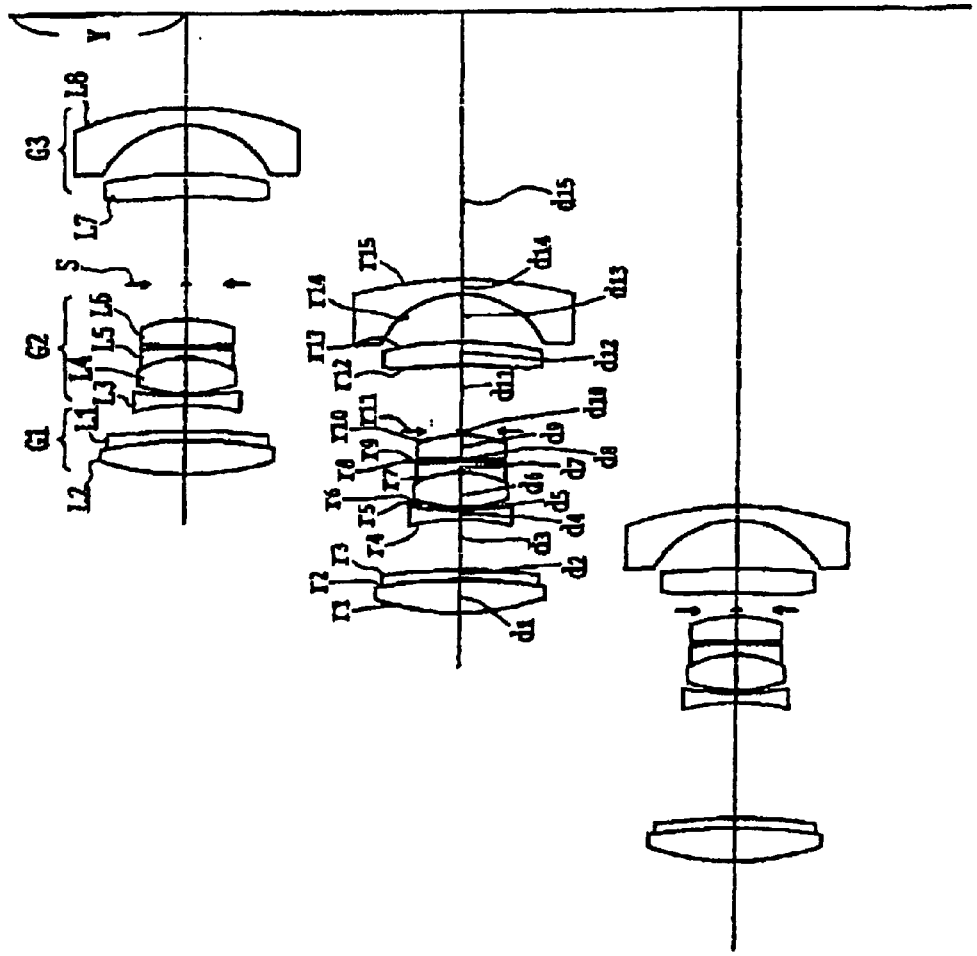

FIGS. 9(a), 9(b) and 9(c) show cross-sectional views of a lens structure of a zoom optical system along an optical axis in accordance with an embodiment example 3 of the present invention, wherein FIG. 9(a) shows a state of the lens structure in a wide-angle position, FIG. 9(b) shows a state of the lens structure in an intermediate focal length, and FIG. 9(c) shows a state of the lens structure in a telephoto position. The zoom optical system of the embodiment example 3 may generally be composed of three lens units.

Figure 10:
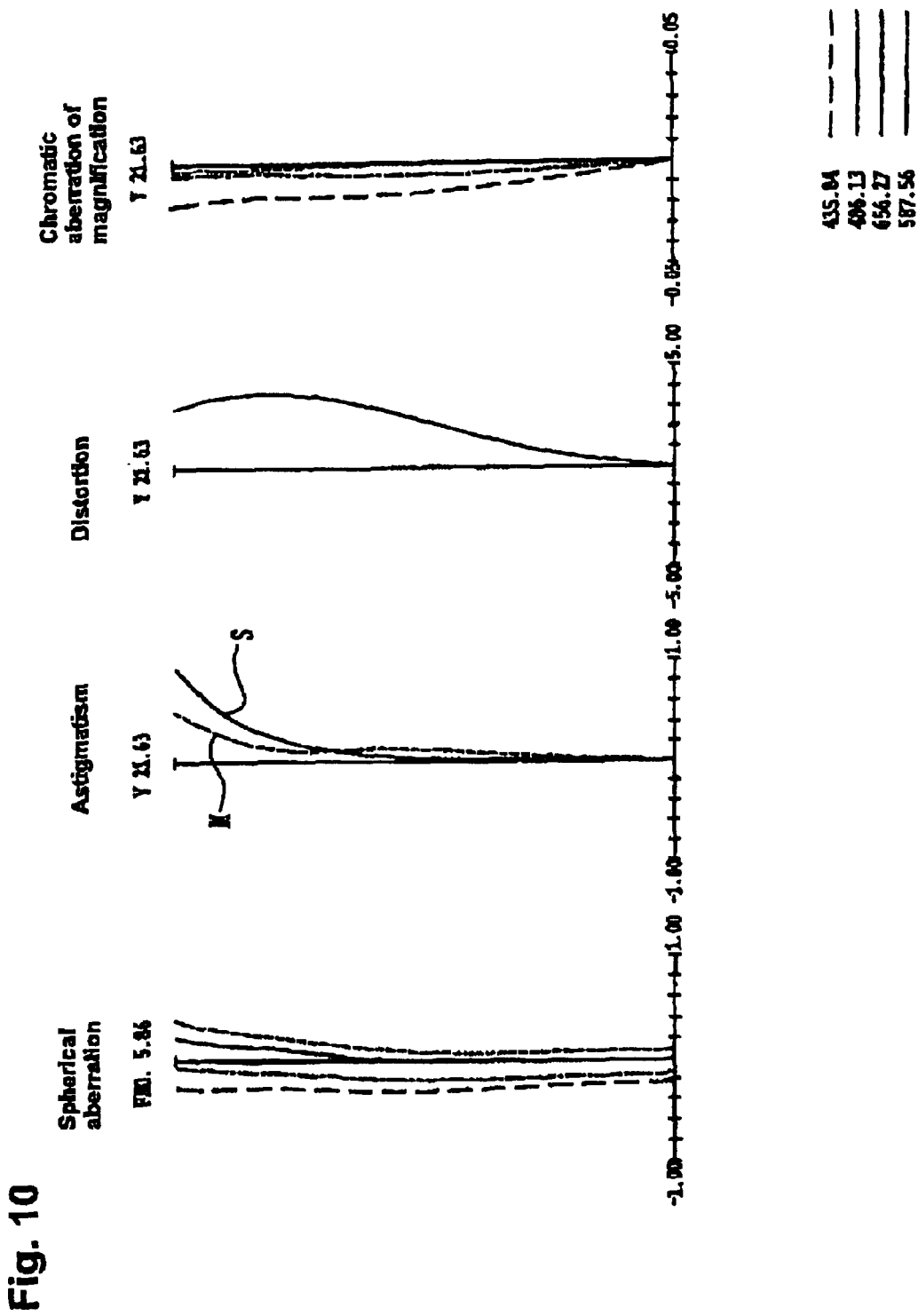
FIG. 10 shows curves visualizing aberration characteristics of spherical aberration, astigmatism, distortion, and chromatic aberration of magnification at the wide-angle position in the embodiment 3.
Figure 11:
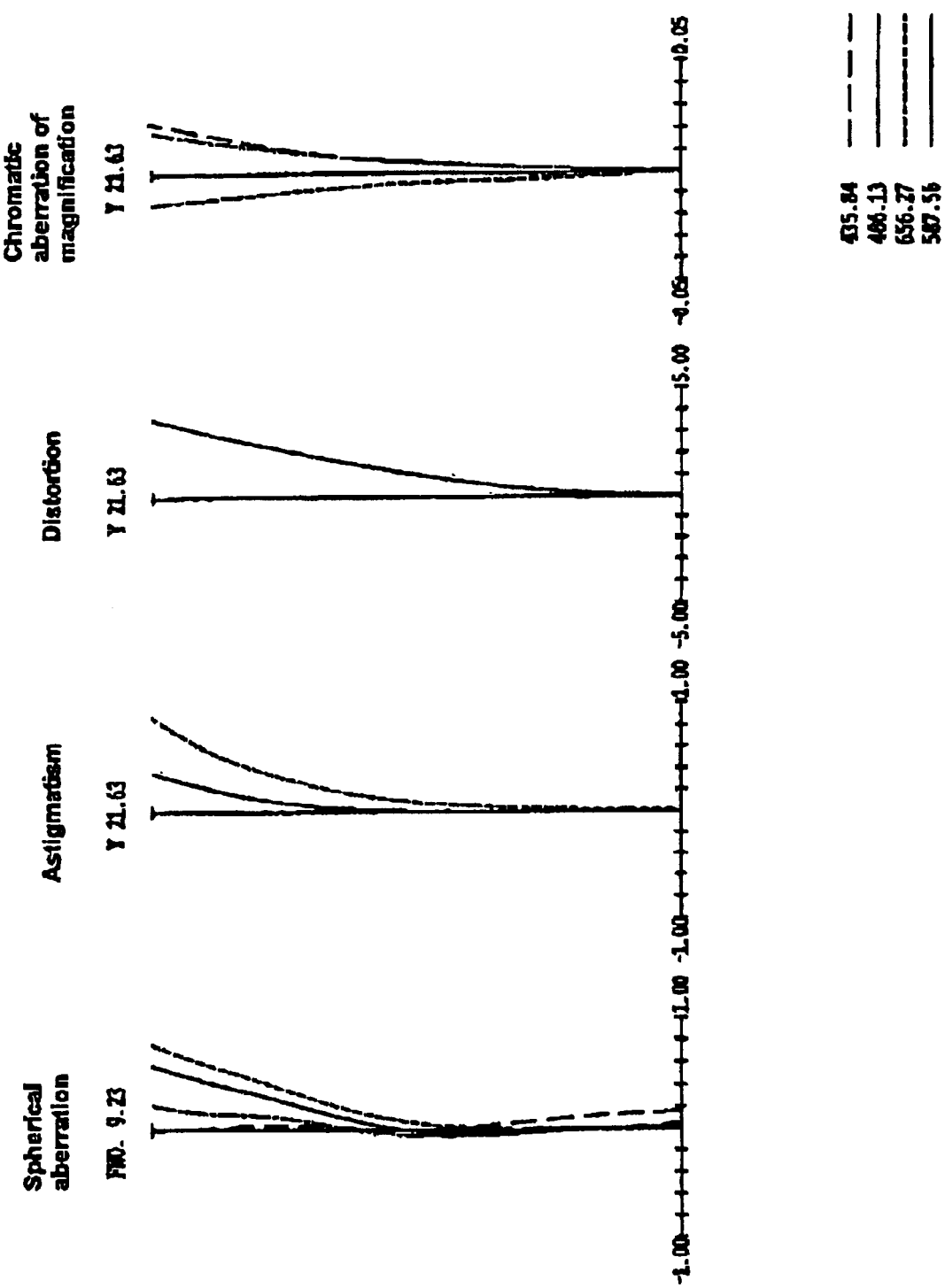
FIG. 11 shows curves visualizing aberration characteristics of spherical aberration, astigmatism, distortion, and chromatic aberration of magnification at the intermediate focal length in the embodiment 3.
Figure 12:
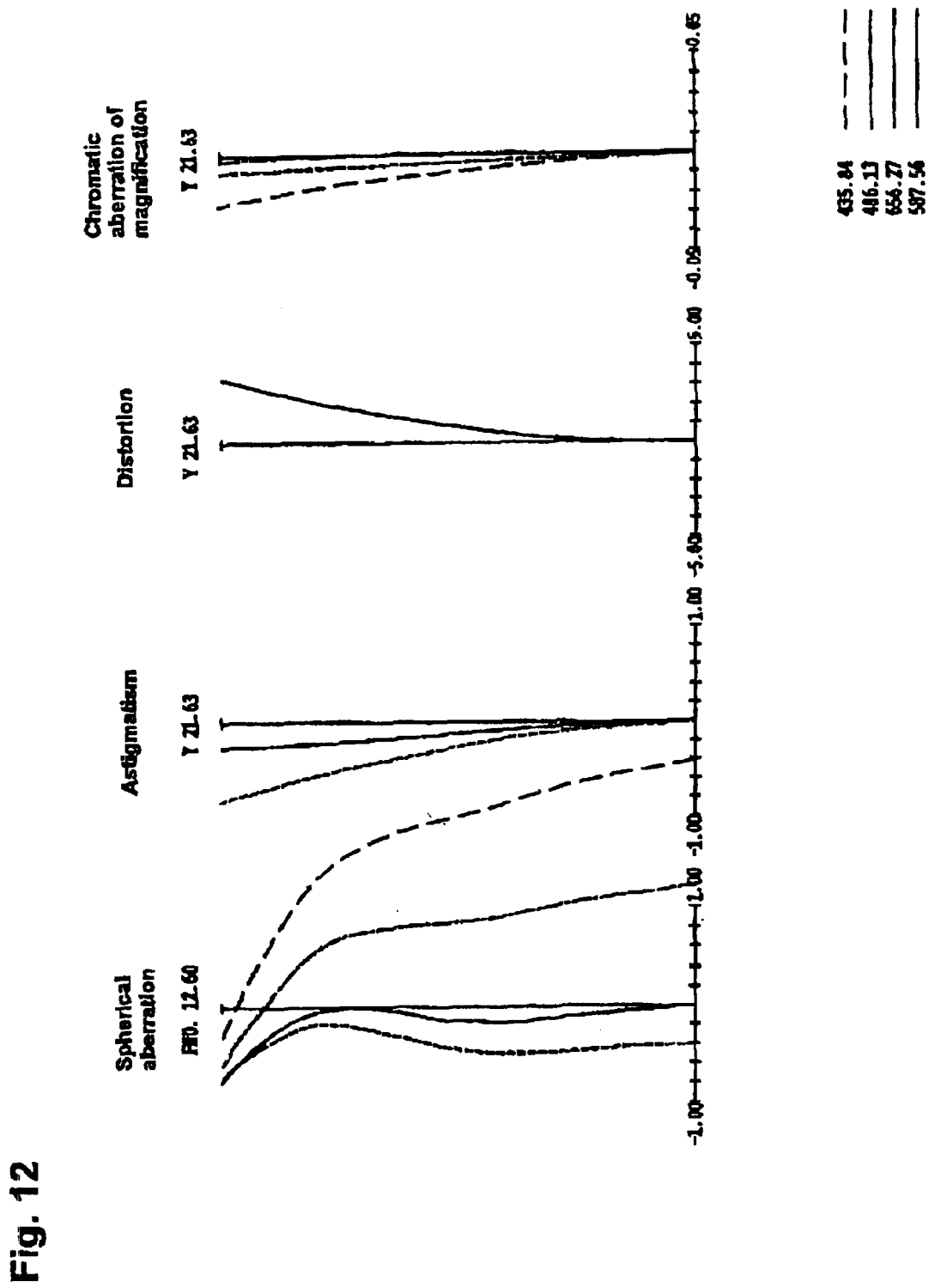
FIG. 12 shows curves visualizing aberration characteristics of spherical aberration, astigmatism, distortion, and chromatic aberration of magnification at the telephoto position in the embodiment 3.

FIGS. 10–12 show curves visualizing aberration characteristics of spherical aberration, astigmatism, distortion, and chromatic aberration of magnification in the embodiment example 3, wherein FIG. 10 shows curves at the wide-angle position, FIG. 11 shows curves at the intermediate focal length, and FIG. 12 shows curves at the telephoto position.

The zoom optical system of the embodiment example 3 includes a first lens unit G1, a second lens unit G2 and a third lens unit G3.

The first lens unit G1 is composed of, in order from an object side, a cemented lens component of a bi-convex positive lens element L2 and a negative meniscus lens element L1 having a concave surface toward the object side.

The second lens unit G2 is composed of, in order from the object side, a bi-concave negative lens element L3, a cemented lens component of a bi-convex positive lens element L4 and a negative meniscus lens element L5 having a concave surface toward the object side, and a bi-convex lens element L6 having bi-aspheric surfaces.

The third lens unit G3 is composed of, in order from the object side, a positive meniscus lens element L7 with bi-aspheric surfaces having a concave surface toward the object side and a negative meniscus lens element L8 having a concave surface toward the object side.

When a magnification is changed from a wide-angle position to a telephoto position, the lens units G1–G3 move toward the object side in a manner that an airspace between the first lens unit G1 and the second lens unit G2 widens and an airspace between the second lens unit G2 and the third lens unit G3 narrows. An aperture stop S is provided on the image side of the second lens unit G2. The aperture stop S moves in a unitary fashion with the second lens unit G2 during a zooming operation.

Optical members that compose the zoom optical system of the embodiment example 3 have the following numerical value data.

Numerical Value Data 3

| | | | |
|---|---|---|---|
| $r_1 = 25.227$ | $d_1 = 3.40$ | $n_{d1} = 1.49700$ | $v_{d1} = 81.54$ |
| $r_2 = -47.795$ | $d_2 = 1.00$ | $n_{d2} = 1.84666$ | $v_{d2} = 23.78$ |
| $r_3 = -80.596$ | $d_3 = D3$ | | |
| $r_4 = -13.656$ | $d_4 = 1.00$ | $n_{d4} = 1.80100$ | $v_{d4} = 34.97$ |
| $r_5 = 20.703$ | $d_5 = 0.20$ | | |
| $r_6 = 13.538$ | $d_6 = 3.91$ | $n_{d6} = 1.59551$ | $v_{d6} = 39.24$ |
| $r_7 = -6.863$ | $d_7 = 1.00$ | $n_{d7} = 1.78800$ | $v_{d7} = 47.37$ |
| $r_8 = -28.708$ | $d_8 = 0.20$ | | |
| $r_9 = 119.619$ (aspheric surface) | $d_9 = 2.35$ | $n_{d9} = 1.58313$ | $v_{d9} = 59.38$ |
| $r_{10} = -10.036$ (aspheric surface) | $d_{10} = 0.80$ | | |
| $r_{11} = $ (stop) | $d_{11} = D11$ | | |
| $r_{12} = -136.118$ (aspheric surface) | $d_{12} = 2.50$ | $n_{d12} = 1.58423$ | $v_{d12} = 30.49$ |
| $r_{13} = -129.956$ (aspheric surface) | $d_{13} = 5.26$ | | |
| $r_{14} = -8.500$ | $d_{14} = 1.50$ | $n_{d14} = 1.77250$ | $v_{d14} = 49.60$ |
| $r_{15} = -25.666$ | $d_{15} = D15$ | | |

Aspherical Surface Coefficients 9-th surface
K = 0.000

$A_4 = -2.65473 \times 10^{-5}$  $A_6 = -7.74791 \times 10^{-6}$  $A_8 = 1.54979 \times 10^{-6}$
$A_{10} = -9.43699 \times 10^{-8}$  $A_{12} = 2.48942 \times 10^{-9}$ -continued 10-th surface
K = 0.000

$A_4 = 1.36199 \times 10^{-4}$  $A_6 = -4.33299 \times 10^{-6}$  $A_8 = 1.19885 \times 10^{-6}$
$A_{10} = -7.70464 \times 10^{-8}$  $A_{12} = 2.11848 \times 10^{-9}$ 12-th surface
K = 0.000

$A_4 = 6.91810 \times 10^{-5}$  $A_6 = -1.15107 \times 10^{-6}$  $A_8 = 1.55775 \times 10^{-7}$
$A_{10} = -3.20323 \times 10^{-9}$  $A_{12} = 2.52034 \times 10^{-11}$ 13-th surface
K = 0.000

$A_4 = -5.70368 \times 10^{-5}$  $A_6 = -1.62907 \times 10^{-6}$  $A_8 = 7.66390 \times 10^{-8}$
$A_{10} = -1.18200 \times 10^{-9}$  $A_{12} = 8.00923 \times 10^{-12}$ Zoom Data

| | Wide-angle Position | Intermediate focal length | Telephoto position |
|---|---|---|---|
| Focal length | 38.999 | 66.098 | 116.060 |
| F N O. | 5.86 | 9.23 | 12.60 |
| ω(°) | 28.3 | 17.5 | 10.2 |
| D3 | 2.81 | 5.28 | 12.41 |
| D11 | 11.53 | 6.68 | 1.72 |
| D15 | 9.00 | 26.19 | 50.27 |

[Embodiment Example 4]

Figure 13:
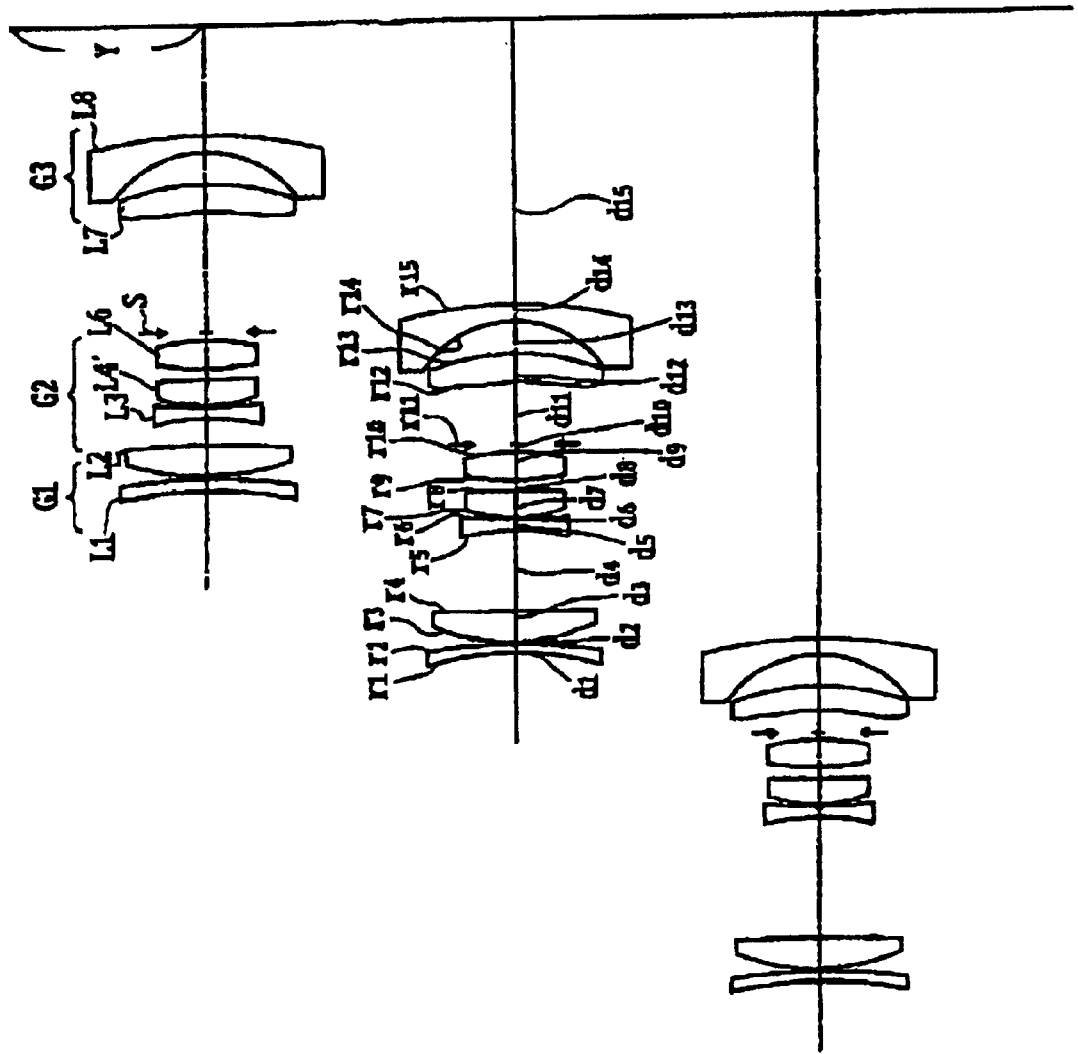

FIGS. 13(a), 13(b) and 13(c) show cross-sectional views of a lens structure of a zoom optical system along an optical axis in accordance with an embodiment example 4 of the present invention, wherein FIG. 13(a) shows a state of the lens structure in a wide-angle position, FIG. 13(b) shows a state of the lens structure in an intermediate focal length, and FIG. 13(c) shows a state of the lens structure in a telephoto position. The zoom optical system of the embodiment example 4 may generally be composed of three lens units.

Figure 14:
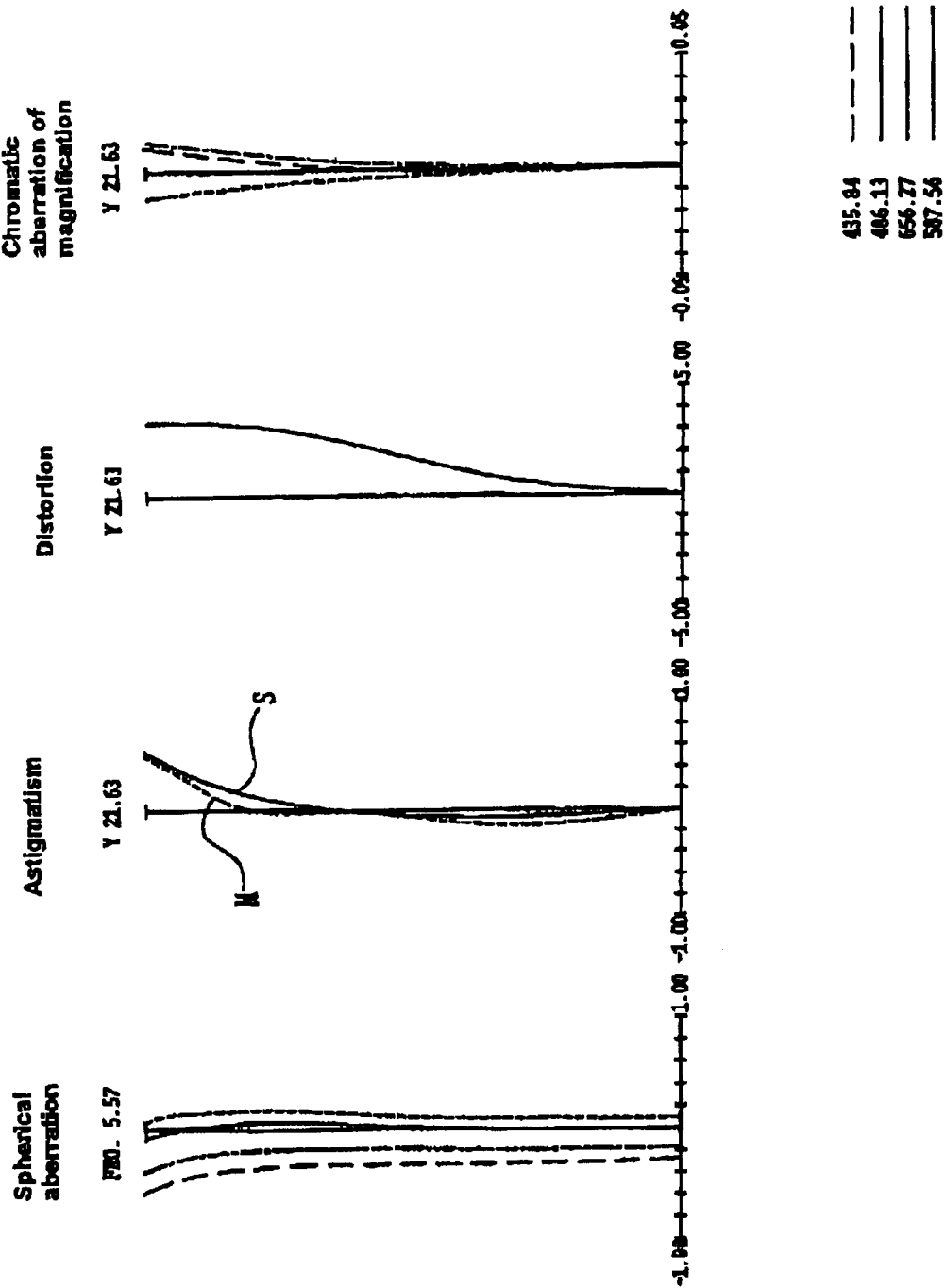
FIG. 14 shows curves visualizing aberration characteristics of spherical aberration, astigmatism, distortion, and chromatic aberration of magnification at the wide-angle position in the embodiment 4.
Figure 15:
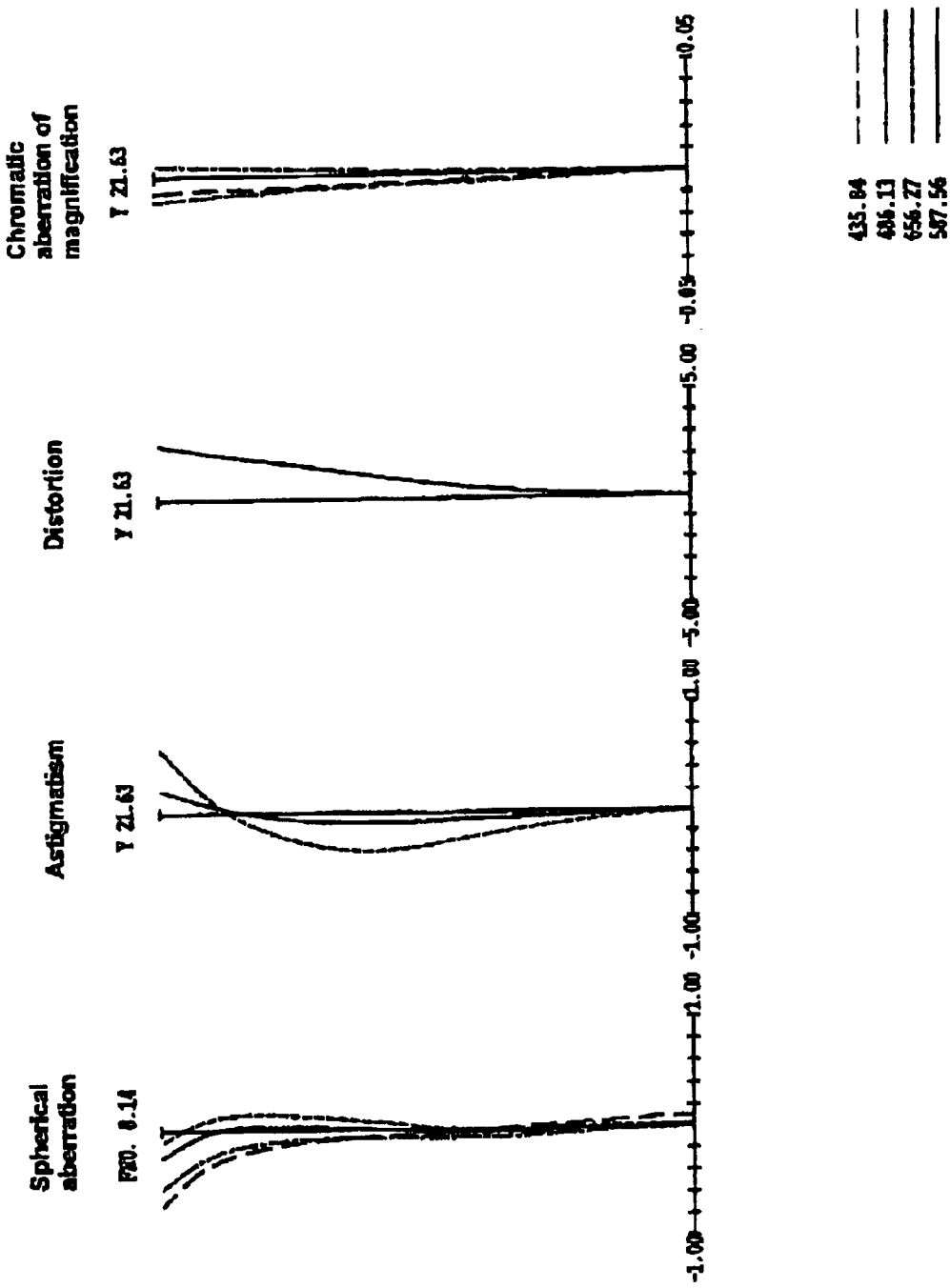
FIG. 15 shows curves visualizing aberration characteristics of spherical aberration, astigmatism, distortion, and chromatic aberration of magnification at the intermediate focal length in the embodiment 4.
Figure 16:
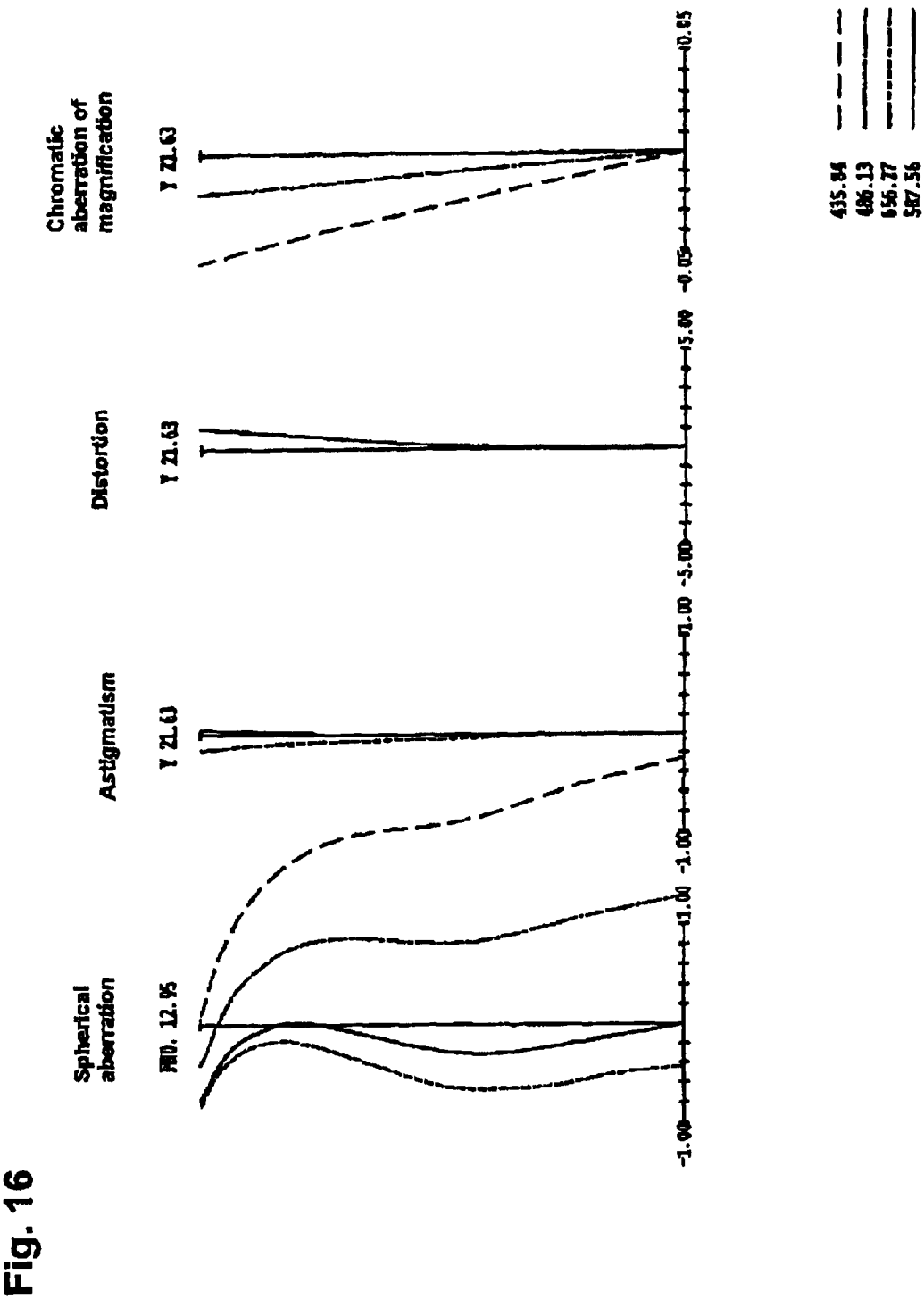
FIG. 16 shows curves visualizing aberration characteristics of spherical aberration, astigmatism, distortion, and chromatic aberration of magnification at the telephoto position in the embodiment 4.

FIGS. 14–16 show curves visualizing aberration characteristics of is spherical aberration, astigmatism, distortion, and chromatic aberration of magnification in the embodiment example 4, wherein FIG. 14 shows curves at the wide-angle position, FIG. 15 shows curves at the intermediate focal length, and FIG. 16 shows curves at the telephoto position.

The zoom optical system of the embodiment example 4 includes a first lens unit G1, a second lens unit G2 and a third lens unit G3.

The first lens unit G1 is composed of, in order from an object side, a negative meniscus lens element L1 having a concave surface toward the object side and a bi-convex positive lens element L2.

The second lens unit G2 is composed of, in order from the object side, a bi-concave negative lens element L3, a positive meniscus lens element L4' having a convex surface toward the object side, and a bi-convex lens element L6 having bi-aspheric surfaces.

The third lens unit G3 is composed of, in order from the object side, a positive meniscus lens element L7 with bi-aspheric surfaces having a concave surface toward the object side and a negative meniscus lens element L8 having a concave surface toward the object side.

When a magnification is changed from a wide-angle position to a telephoto position, the lens units G1–G3 move toward the object side in a manner that an airspace between the first lens unit G1 and the second lens unit G2 widens and an airspace between the second lens unit G2 and the third lens unit G3 narrows. An aperture stop S is provided on the image side of the second lens unit G2. The aperture stop S moves in a unitary fashion with the second lens unit G2 during a zooming operation.

Optical members that compose the zoom optical system of the embodiment example 4 have the following numerical value data.

Numerical Value Data 4

| | | | |
|---|---|---|---|
| $r_1 = -33.400$ | $d_1 = 1.00$ | $n_{d1} = 1.84666$ | $v_{d1} = 23.78$ |
| $r_2 = -54.607$ | $d_2 = 0.20$ | | |
| $r_3 = 17.635$ | $d_3 = 2.97$ | $n_{d3} = 1.49700$ | $v_{d3} = 81.54$ |
| $r_4 = -159.899$ | $d_4 = D4$ | | |
| $r_5 = -15.760$ | $d_5 = 1.00$ | $n_{d5} = 1.78800$ | $v_{d5} = 47.37$ |
| $r_6 = 26.866$ | $d_6 = 0.21$ | | |
| $r_7 = 12.999$ | $d_7 = 2.50$ | $n_{d7} = 1.56732$ | $v_{d7} = 42.82$ |
| $r_8 = 217.826$ | $d_8 = 1.00$ | | |
| $r_9 = 30.227$ (aspheric surface) | $d_9 = 2.57$ | $n_{d9} = 1.58313$ | $v_{d9} = 59.38$ |
| $r_{10} = -15.201$ (aspheric surface) | $d_{10} = 0.80$ | | |
| $r_{11} = $ (stop) | $d_{11} = D11$ | | |
| $r_{12} = -27.082$ (aspheric surface) | $d_{12} = 2.50$ | $n_{d12} = 1.58423$ | $v_{d12} = 30.49$ |
| $r_{13} = -24.253$ (aspheric surface) | $d_{13} = 2.94$ | | |
| $r_{14} = -9.325$ | $d_{14} = 1.50$ | $n_{d14} = 1.72916$ | $v_{d14} = 54.68$ |
| $r_{15} = -45.282$ | $d_{15} = D15$ | | |

Aspherical surface coefficients 9-th surface
K = 0.000

$A_4 = 8.28810 \times 10^{-6}$   $A_6 = 2.05525 \times 10^{-8}$   $A_8 = 2.70369 \times 10^{-7}$
$A_{10} = -2.65756 \times 10^{-9}$   $A_{12} = -1.23506 \times 10^{-10}$ 10-th surface
K = 0.000

$A_4 = 1.84138 \times 10^{-4}$   $A_6 = 3.28778 \times 10^{-6}$   $A_8 = -1.33644 \times 10^{-7}$
$A_{10} = 2.42402 \times 10^{-8}$   $A_{12} = -8.59865 \times 10^{-10}$ 12-th surface
K = 0.000

$A_4 = 9.14163 \times 10^{-5}$   $A_6 = -6.83379 \times 10^{-6}$   $A_8 = 4.04293 \times 10^{-7}$
$A_{10} = -9.35746 \times 10^{-9}$   $A_{12} = 8.41597 \times 10^{-11}$ 13-th surface
K = 0.000

$A_4 = -4.85540 \times 10^{-5}$   $A_6 = -3.46263 \times 10^{-6}$   $A_8 = 1.54908 \times 10^{-7}$
$A_{10} = -3.02491 \times 10^{-9}$   $A_{12} = 2.29389 \times 10^{-11}$ Zoom Data

| | Wide-angle Position | Intermediate focal length | Telephoto position |
|---|---|---|---|
| Focal length | 38.987 | 66.069 | 120.815 |
| F N O. | 5.57 | 8.14 | 12.95 |
| ω(°) | 28.2 | 17.7 | 10.0 |
| D4 | 2.50 | 7.56 | 11.51 |
| D11 | 11.06 | 6.00 | 2.05 |
| D15 | 10.00 | 26.12 | 57.86 |

[Embodiment Example 5]

Figure 17:
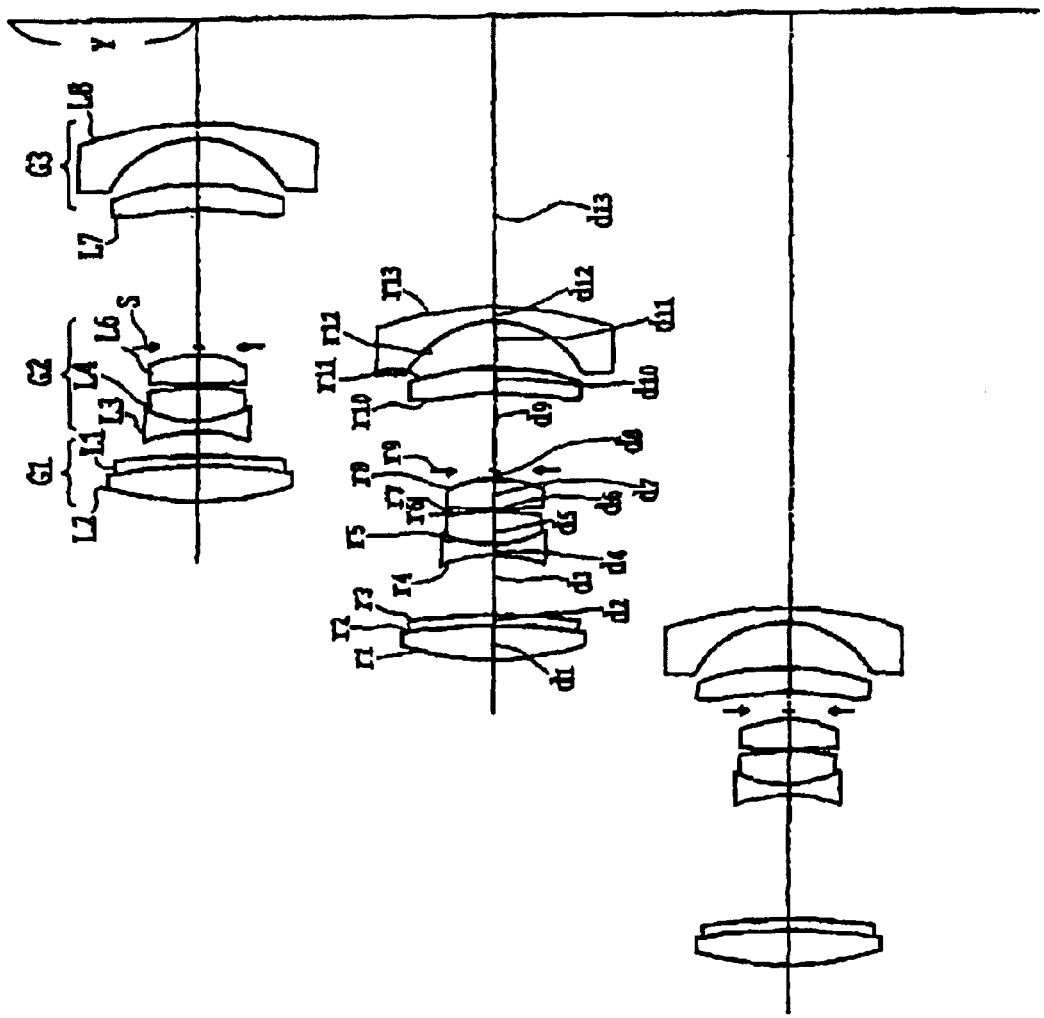

FIGS. 17(a), 17(b) and 17 c) show cross-sectional views of a lens structure of a zoom optical system along an optical axis in accordance with an embodiment example 5 of the present invention, wherein FIG. 17(a) shows a state of the lens structure in a wide-angle position, FIG. 17(b) shows a state of the lens structure in an intermediate focal length, and FIG. 17(c) shows a state of the lens structure in a telephoto position. The zoom optical system of the embodiment example 5 may generally be composed of three lens units.

Figure 18:
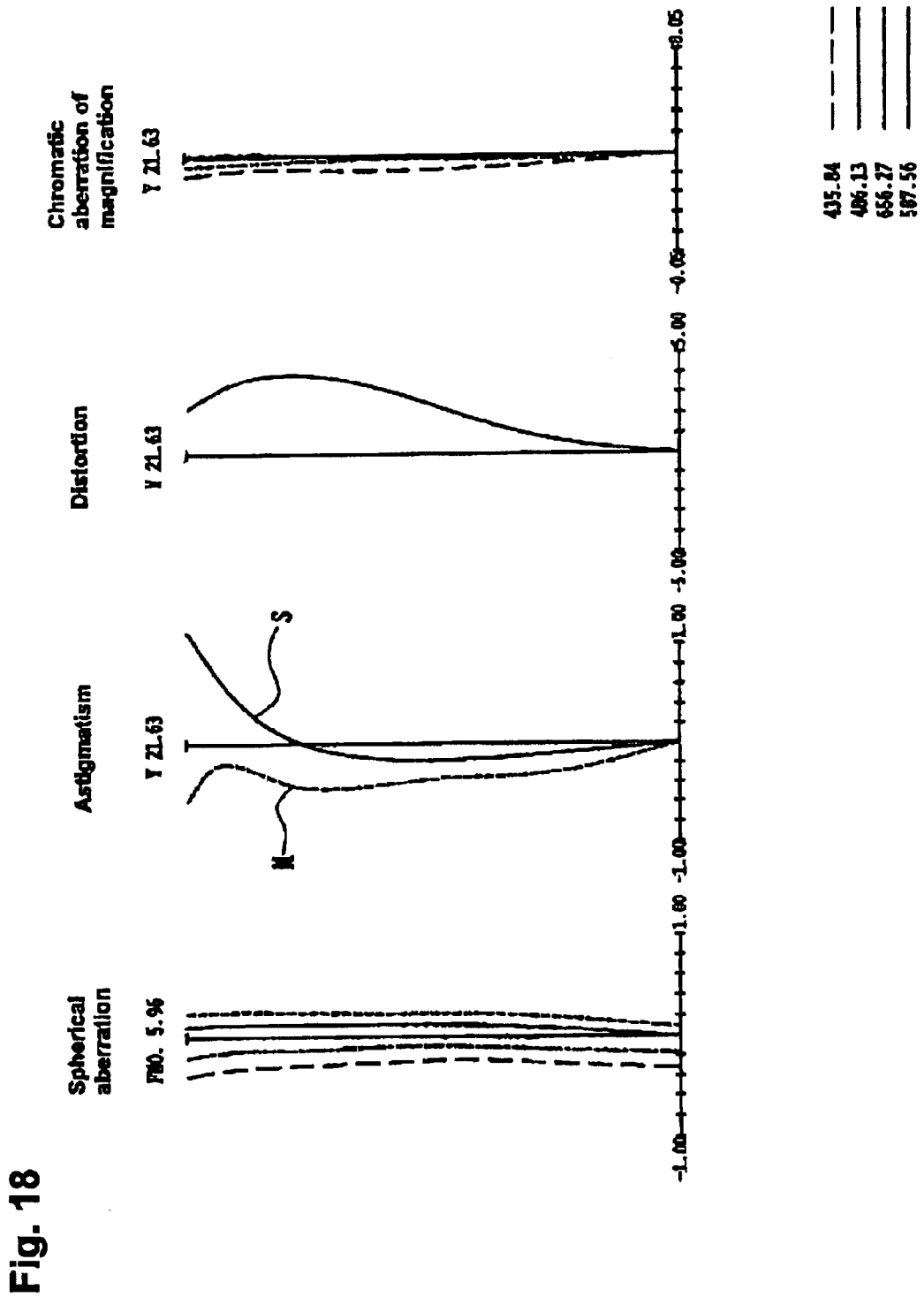
FIG. 18 shows curves visualizing aberration characteristics of spherical aberration, astigmatism, distortion, and chromatic aberration of magnification at the wide-angle position in the embodiment 5.
Figure 19:
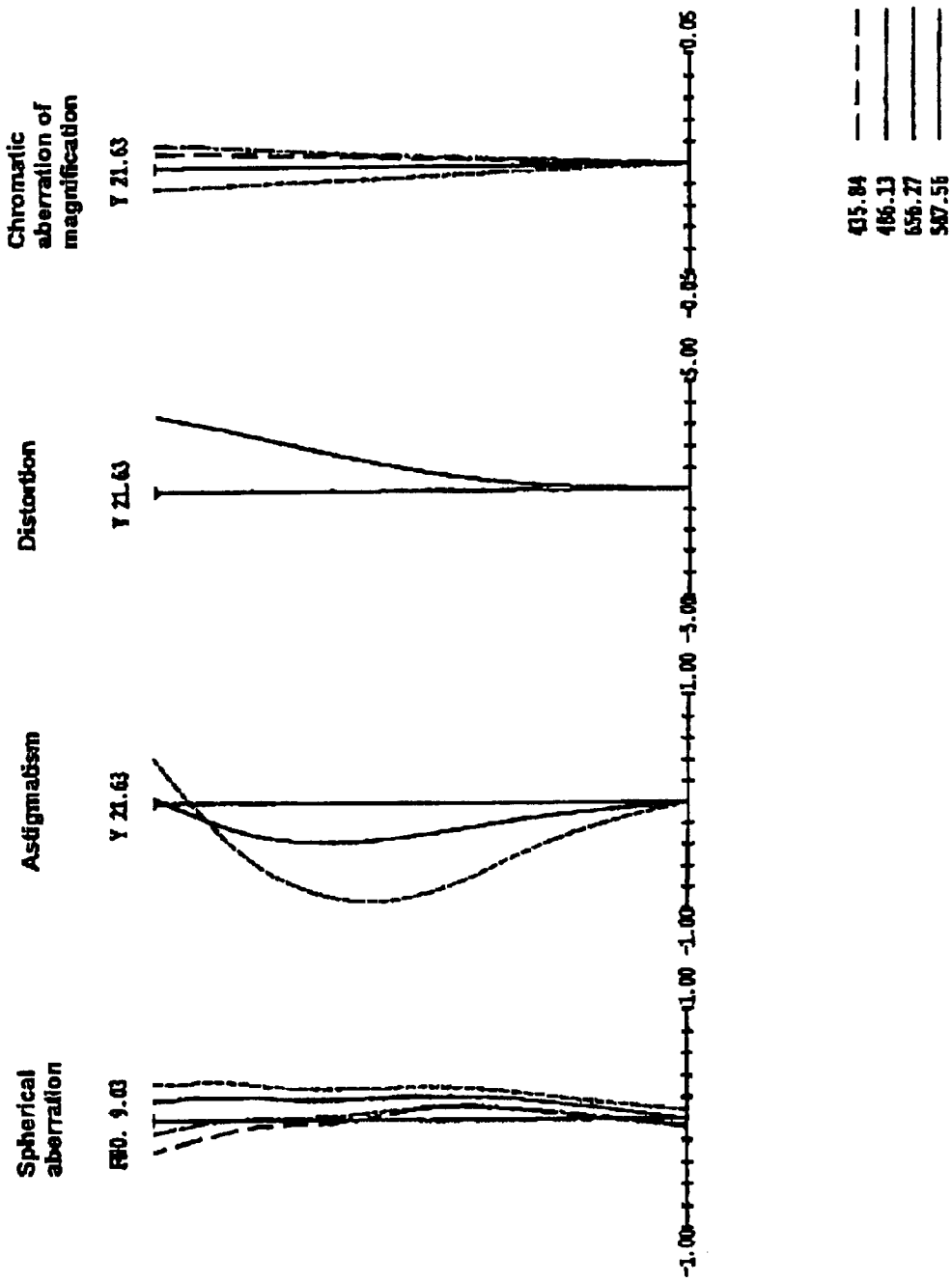
FIG. 19 shows curves visualizing aberration characteristics of spherical aberration, astigmatism, distortion, and chromatic aberration of magnification at the intermediate focal length in the embodiment 5.
Figure 20:
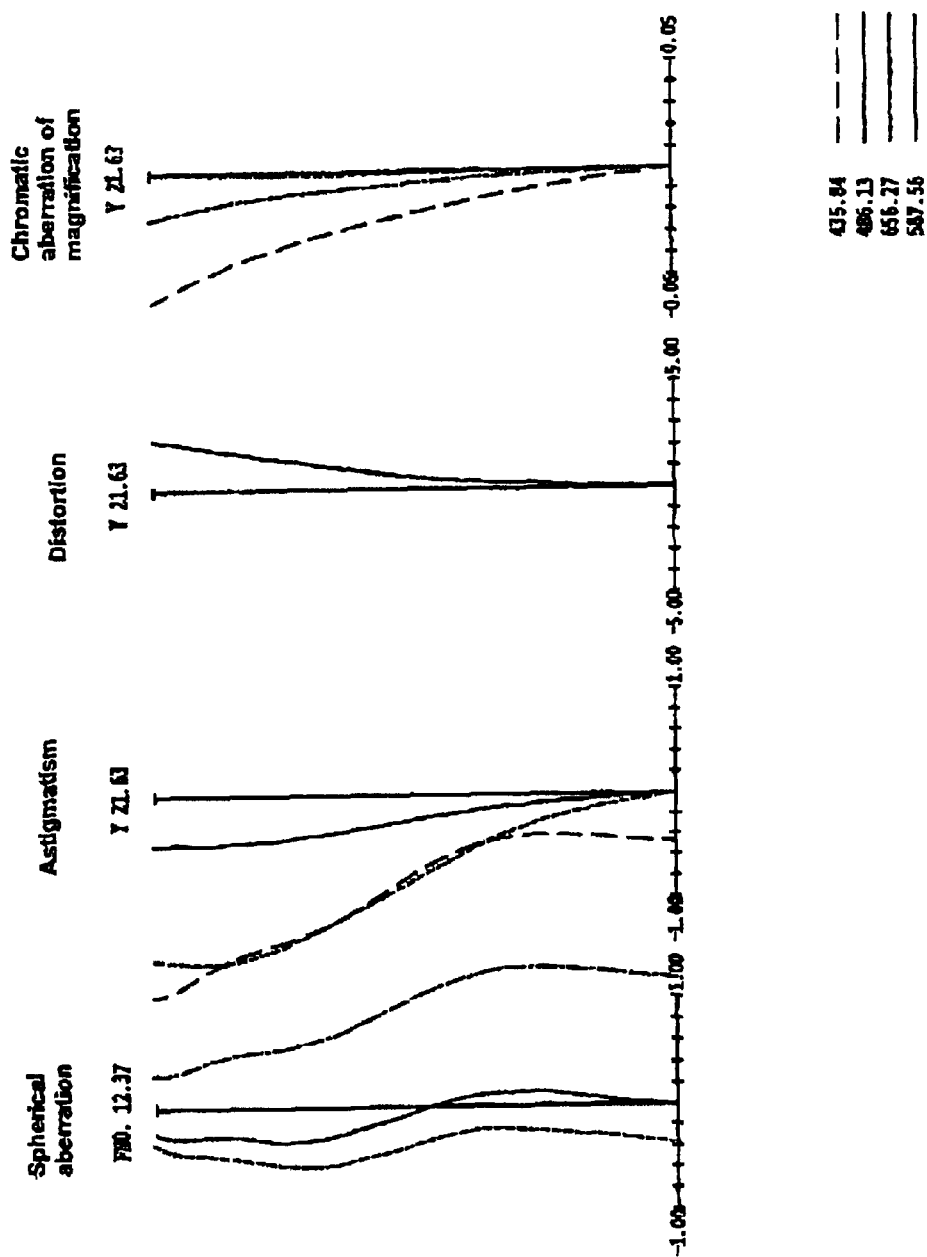
FIG. 20 shows curves visualizing aberration characteristics of spherical aberration, astigmatism, distortion, and chromatic aberration of magnification at the telephoto position in the embodiment 5.

FIGS. 18–20 show curves visualizing aberration characteristics of spherical aberration, astigmatism, distortion, and chromatic aberration of magnification in the embodiment example 5, wherein FIG. 18 shows curves at the wide-angle position, FIG. 19 shows curves at the intermediate focal length, and FIG. 20 shows curves at the telephoto position.

The zoom optical system of the embodiment example 5 includes a first lens unit G1, a second lens unit G2 and a third lens unit G3.

The first lens unit G1 is composed of, in order from an object side, a cemented lens component of a bi-convex positive lens element L2 and a negative meniscus lens element L1 having a concave surface toward the object side.

The second lens unit G2 is composed of, in order from the object side, a cemented lens component of a bi-concave negative lens element L3 and a bi-convex positive lens element L4, and a bi-convex lens element L6 having bi-aspheric surfaces.

The third lens unit G3 is composed of, in order from the object side, a positive meniscus lens element L7 with bi-aspheric surfaces having a concave surface toward the object side and a negative meniscus lens element L8 having a concave surface toward the object side.

When a magnification is changed from a wide-angle position to a telephoto position, the lens units G1–G3 move toward the object side in a manner that an airspace between the first lens unit G1 and the second lens unit G2 widens and an airspace between the second lens unit G2 and the third lens unit G3 narrows. An aperture stop S is provided on the image side of the second lens unit G2. The aperture stop S moves in a unitary fashion with the second lens unit G2 during a zooming operation.

Optical members that compose the zoom optical system of the embodiment example 5 have the following numerical value data.

Numerical Value Data 5

| | | | |
|---|---|---|---|
| $r_1 = 21.155$ | $d_1 = 3.43$ | $n_{d1} = 1.49700$ | $v_{d1} = 81.54$ |
| $r_2 = -48.151$ | $d_2 = 1.00$ | $n_{d2} = 1.84666$ | $v_{d2} = 23.78$ |
| $r_3 = -101.270$ | $d_3 = D3$ | | |
| $r_4 = -11.713$ | $d_4 = 1.00$ | $n_{d4} = 1.78800$ | $v_{d4} = 47.37$ |
| $r_5 = 8.716$ | $d_5 = 3.18$ | $n_{d5} = 1.54814$ | $v_{d5} = 45.79$ |
| $r_6 = -31.230$ | $d_6 = 0.27$ | | |
| $r_7 = 30.728$ (aspheric surface) | $d_7 = 2.99$ | $n_{d7} = 1.58313$ | $v_{d7} = 59.38$ |
| $r_8 = -9.846$ (aspheric surface) | $d_8 = 0.80$ | | |
| $r_9 = $ (stop) | $d_9 = D9$ | | |
| $r_{10} = -28.558$ (aspheric surface) | $d_{10} = 2.50$ | $n_{d10} = 1.58423$ | $v_{d10} = 30.49$ |
| $r_{11} = -26.035$ (aspheric surface) | $d_{11} = 4.32$ | | |
| $r_{12} = -8.738$ | $d_{12} = 1.50$ | $n_{d12} = 1.74100$ | $v_{d12} = 52.64$ |
| $r_{13} = -26.930$ | $d_{13} = D13$ | | |

Aspherical surface coefficients 7-th surface
K = 0.000

$A_4 = -1.59412 \times 10^{-5}$   $A_6 = -1.83764 \times 10^{-5}$   $A_8 = 1.32295 \times 10^{-6}$
$A_{10} = -6.73809 \times 10^{-8}$   $A_{12} = 8.48598 \times 10^{-10}$ 8-th surface
K = 0.000

$A_4 = 1.04507 \times 10^{-4}$   $A_6 = -2.26564 \times 10^{-5}$   $A_8 = 1.92669 \times 10^{-6}$
$A_{10} = -1.01402 \times 10^{-7}$   $A_{12} = 1.74362 \times 10^{-9}$ 10-th surface
K = 0.000

$A_4 = 1.73069 \times 10^{-4}$   $A_6 = -6.89901 \times 10^{-7}$   $A_8 = 3.63145 \times 10^{-8}$
$A_{10} = -2.12637 \times 10^{-9}$   $A_{12} = 2.62176 \times 10^{-11}$ -continued 11-th surface
K = 0.000

$A_4 = 2.54833 \times 10^{-5}$  $A_6 = 1.97264 \times 10^{-6}$  $A_8 = -8.39671 \times 10^{-8}$
$A_{10} = 5.62363 \times 10^{-10}$  $A_{12} = 1.83578 \times 10^{-12}$ Zoom Data

|  | Wide-angle Position | Intermediate focal length | Telephoto position |
|---|---|---|---|
| Focal length | 39.001 | 66.107 | 120.958 |
| F N O. | 5.96 | 9.03 | 12.83 |
| ω(°) | 28.5 | 17.5 | 9.9 |
| D3 | 2.65 | 6.02 | 12.37 |
| D9 | 12.97 | 7.43 | 1.85 |
| D13 | 9.72 | 27.61 | 57.05 |

[Embodiment Example 6]

Figure 21:
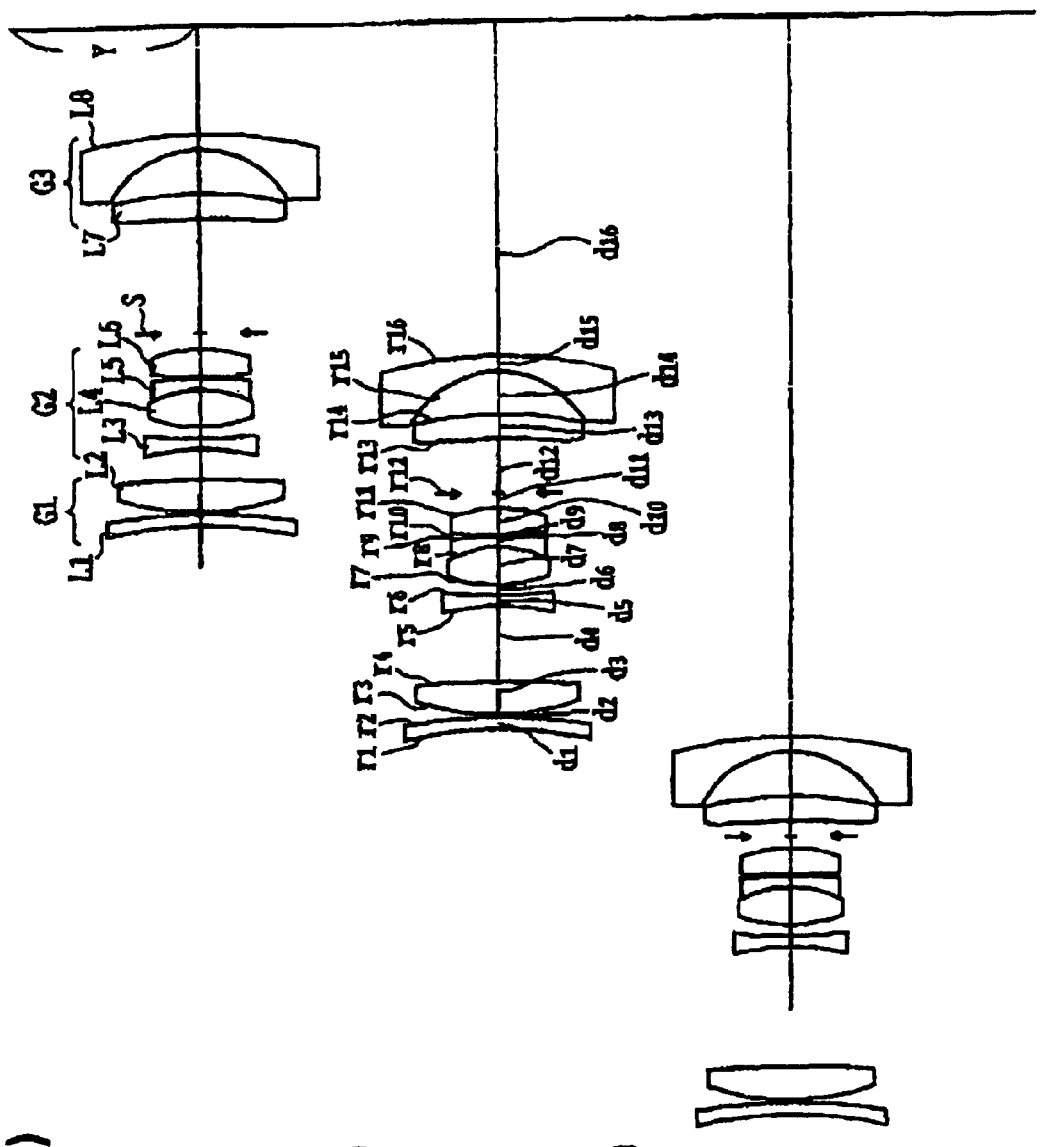

FIGS. 21(a), 21(b) and 21(c) show cross-sectional views of a lens structure of a zoom optical system along an optical axis in accordance with an embodiment example 6 of the present invention, wherein FIG. 21(a) shows a state of the lens structure in a wide-angle position, FIG. 21(b) shows a state of the lens structure in an intermediate focal length, and FIG. 21(c) shows a state of the lens structure in a telephoto position. The zoom optical system of the embodiment example 6 may generally be composed of three lens units.

Figure 22:
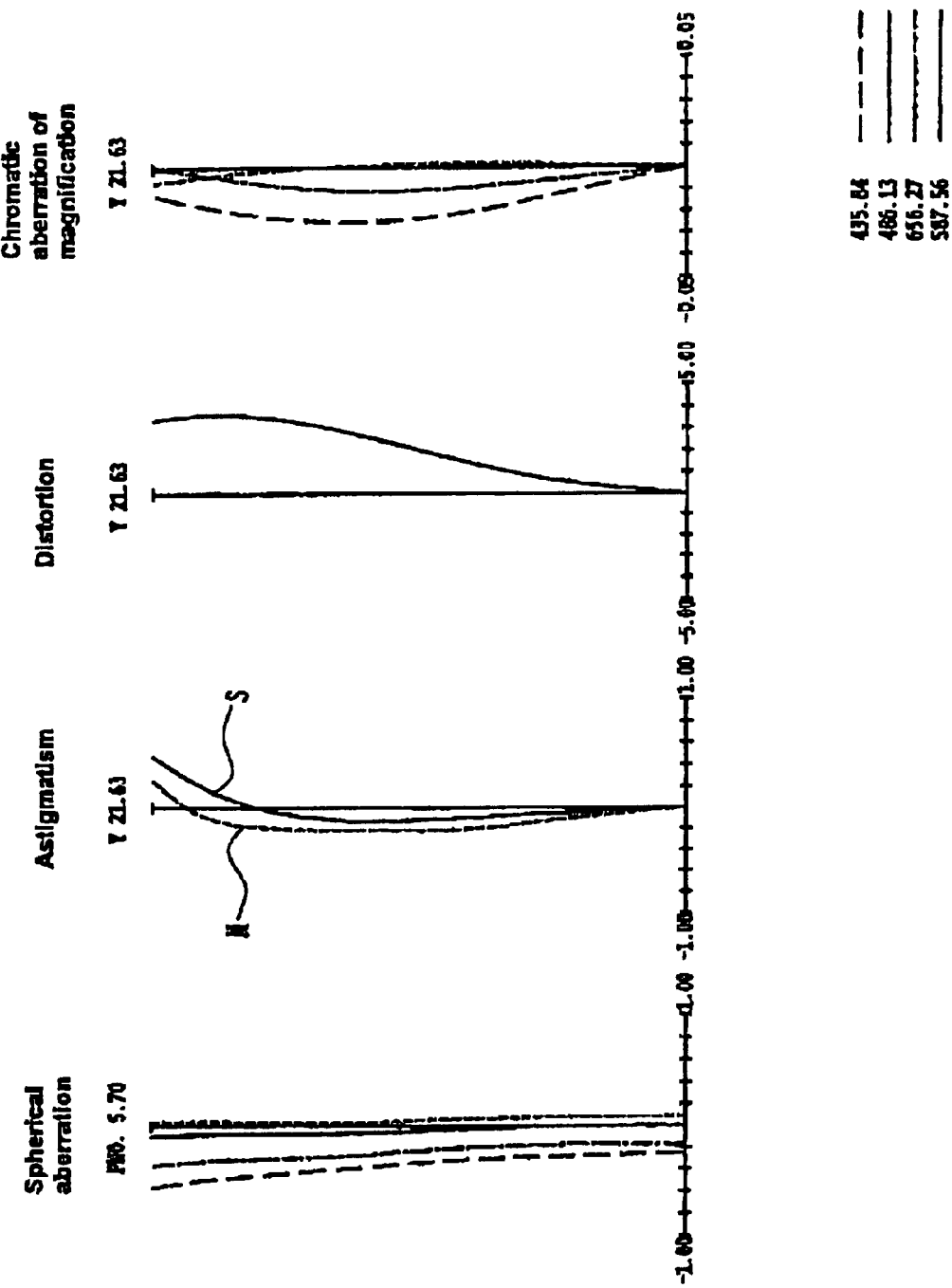
FIG. 22 shows curves visualizing aberration characteristics of spherical aberration, astigmatism, distortion, and chromatic aberration of magnification at the wide-angle position in the embodiment 6.
Figure 23:
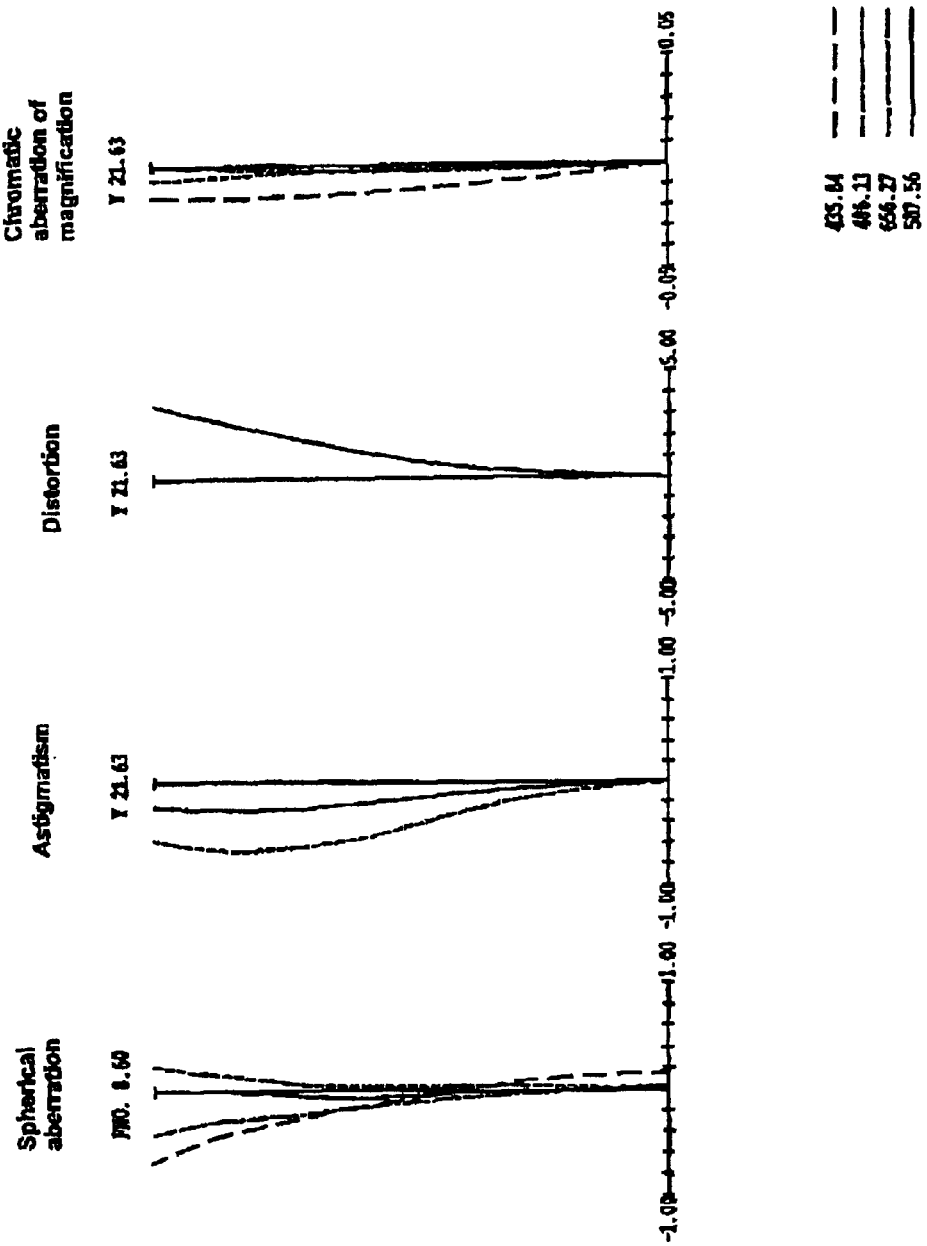
FIG. 23 shows curves visualizing aberration characteristics of spherical aberration, astigmatism, distortion, and chromatic aberration of magnification at the intermediate focal length in the embodiment 6.
Figure 24:
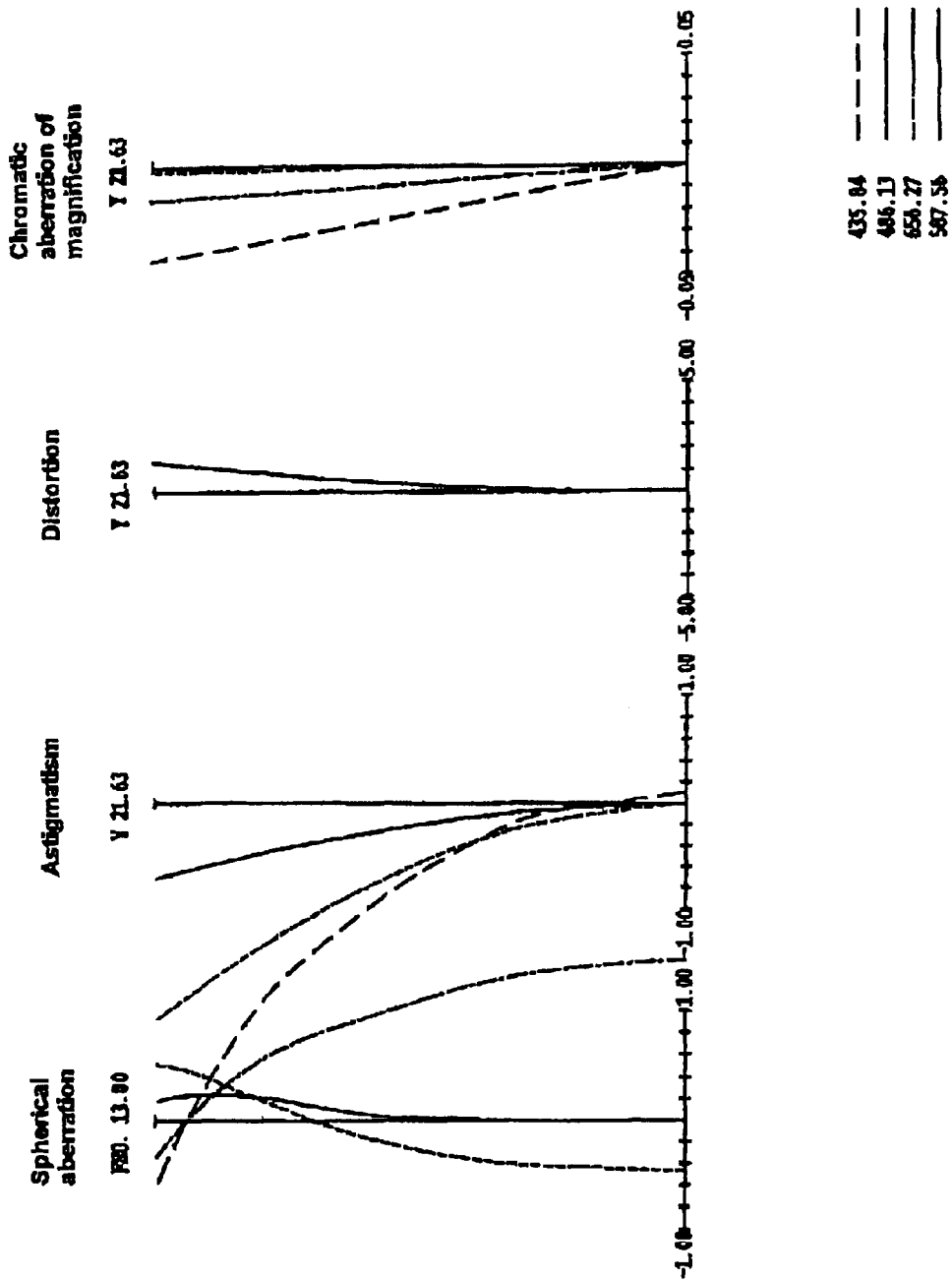
FIG. 24 shows curves visualizing aberration characteristics of spherical aberration, astigmatism, distortion, and chromatic aberration of magnification at the telephoto position in the embodiment 6.

FIGS. 22–24 show curves visualizing aberration characteristics of spherical aberration, astigmatism, distortion, and chromatic aberration of magnification in the embodiment example 6, wherein FIG. 22 shows curves at the wide-angle position, FIG. 23 shows curves at the intermediate focal length, and FIG. 24 shows curves at the telephoto position.

The zoom optical system of the embodiment example 6 includes a first lens unit G1, a second lens unit G2 and a third lens unit G3.

The first lens unit G1 is composed of, in order from an object side, a negative meniscus lens element L1 having a concave surface toward the object side and a bi-convex positive lens element L2.

The second lens unit G2 is composed of, in order from the object side, a bi-concave negative lens element L3, a cemented lens component of a bi-convex positive lens element L4 and a negative meniscus lens element L5 having a concave surface toward the object side, and a bi-convex lens element L6 having bi-aspheric surfaces.

The third lens unit G3 is composed of, in order from the object side, a positive meniscus lens element L7 with bi-aspheric surfaces having a concave surface toward the object side and a negative meniscus lens element L8 having a concave surface toward the object side.

When a magnification is changed from a wide-angle position to a telephoto position, the lens units G1–G3 move toward the object side in a manner that an airspace between the first lens unit G1 and the second lens unit G2 widens and an airspace between the second lens unit G2 and the third lens unit G3 narrows. An aperture stop S is provided on the image side of the second lens unit G2. The aperture stop S moves in a unitary fashion with the second lens unit G2 during a zooming operation.

Optical members that compose the zoom optical system of the embodiment example 6 have the following numerical value data.

Numerical Value Data 6

$r_1 = -63.818$    $d_1 = 1.10$    $n_{d1} = 1.84666$    $v_{d1} = 23.78$
$r_2 = -114.092$   $d_2 = 0.20$
$r_3 = 26.229$     $d_3 = 3.11$    $n_{d3} = 1.49700$    $v_{d3} = 81.54$
$r_4 = -76.625$    $d_4 = D4$
$r_5 = -14.615$    $d_5 = 1.00$    $n_{d5} = 1.80100$    $v_{d5} = 34.97$
$r_6 = 42.069$     $d_6 = 0.67$
$r_7 = 16.567$     $d_7 = 4.14$    $n_{d7} = 1.60342$    $v_{d7} = 38.03$
$r_8 = -11.630$    $d_8 = 1.04$    $n_{d8} = 1.79952$    $v_{d8} = 42.22$
$r_9 = -34.852$    $d_9 = 0.20$
$r_{10} = 76.502$  $d_{10} = 2.81$ $n_{d10} = 1.58313$   $v_{d10} = 59.38$
(aspheric surface)
$r_{11} = -14.495$ $d_{11} = 1.00$
(aspheric surface)
$r_{12} = $ (stop) $d_{12} = D12$
$r_{13} = -34.667$ $d_{13} = 2.47$ $n_{d13} = 1.58423$   $v_{d13} = 30.49$
(aspheric surface)
$r_{14} = -27.436$ $d_{14} = 3.82$
(aspheric surface)
$r_{15} = -9.200$  $d_{15} = 1.50$ $n_{d15} = 1.74100$   $v_{d15} = 52.64$
$r_{16} = -38.103$ $d_{16} = D16$ Aspherical Surface Coefficients 10-th surface
K = 0.000

$A_4 = 1.10064 \times 10^{-4}$   $A_6 = -1.82391 \times 10^{-5}$  $A_8 = 1.80608 \times 10^{-6}$
$A_{10} = -7.24136 \times 10^{-8}$  $A_{12} = 1.10909 \times 10^{-9}$ 11-th surface
K = 0.000

$A_4 = 2.31017 \times 10^{-4}$   $A_6 = -1.92835 \times 10^{-5}$  $A_8 = 1.96980 \times 10^{-6}$
$A_{10} = -8.12020 \times 10^{-8}$  $A_{12} = 1.27666 \times 10^{-9}$ 13-th surface
K = 0.000

$A_4 = 1.50347 \times 10^{-4}$   $A_6 = 3.14989 \times 10^{-7}$   $A_8 = -1.39892 \times 10^{-8}$
$A_{10} = 3.07386 \times 10^{-10}$  $A_{12} = 1.62652 \times 10^{-12}$ 14-th surface
K = 0.000

$A_4 = 4.08616 \times 10^{-5}$   $A_6 = -9.78541 \times 10^{-8}$  $A_8 = -2.70206 \times 10^{-9}$
$A_{10} = -3.20809 \times 10^{-10}$  $A_{12} = 6.56410 \times 10^{-12}$ Zoom Data

|  | Wide-angle Position | Intermediate focal length | Telephoto position |
|---|---|---|---|
| Focal Length | 39.000 | 72.598 | 135.289 |
| F N O. | 5.70 | 8.60 | 13.00 |
| ω(°) | 28.2 | 16.0 | 8.9 |
| D4 | 3.19 | 7.86 | 11.91 |
| D12 | 11.38 | 5.61 | 1.80 |
| D16 | 10.27 | 31.99 | 70.16 |

Table 1 below shows values of parameters in each of the embodiment examples, and Table 2 below shows values of conditional formulas.

TABLE 1

| Embodiment Example | $f_W$ | $f_T$ | $L_T$ | $f_{G1}$ | $f_{G2}$ | $f_{G3}$ | $f_{G2N}$ | Y |
|---|---|---|---|---|---|---|---|---|
| 1 | 39.00 | 120.86 | 89.10 | 49.09 | 33.63 | −15.82 | −13.09 | 21.63 |
| 2 | 39.00 | 116.18 | 86.18 | 48.30 | 33.79 | −15.83 | −12.66 | 21.63 |
| 3 | 39.00 | 116.06 | 87.51 | 44.10 | 33.07 | −17.07 | −10.14 | 21.63 |
| 4 | 38.99 | 120.82 | 90.61 | 45.39 | 34.36 | −16.90 | −12.48 | 21.63 |
| 5 | 39.00 | 120.96 | 92.27 | 40.89 | 33.83 | −18.60 | −13.48 | 21.63 |

TABLE 1-continued

| Embodiment Example | $f_W$ | $f_T$ | $L_T$ | $f_{G1}$ | $f_{G2}$ | $f_{G3}$ | $f_{G2N}$ | Y |
|---|---|---|---|---|---|---|---|---|
| 6 | 39.00 | 135.29 | 106.93 | 50.77 | 31.40 | −18.10 | −13.44 | 21.63 |

TABLE 2

| Embodiment Example | Conditional Formula (1) | Conditional Formula (2) | Conditional Formula (3) | Conditional Formula (4) | Conditional Formula (5) | Conditional Formula (6) | Conditional Formula (7) |
|---|---|---|---|---|---|---|---|
| 1 | 0.737 | 1.259 | 0.862 | 0.406 | 0.336 | 1.803 | 3.099 |
| 2 | 0.742 | 1.238 | 0.866 | 0.406 | 0.325 | 1.803 | 2.979 |
| 3 | 0.754 | 1.131 | 0.848 | 0.438 | 0.260 | 1.803 | 2.976 |
| 4 | 0.750 | 1.164 | 0.881 | 0.433 | 0.320 | 1.802 | 3.099 |
| 5 | 0.763 | 1.048 | 0.867 | 0.477 | 0.346 | 1.803 | 3.101 |
| 6 | 0.790 | 1.302 | 0.805 | 0.464 | 0.345 | 1.803 | 3.469 |

Figure 25:
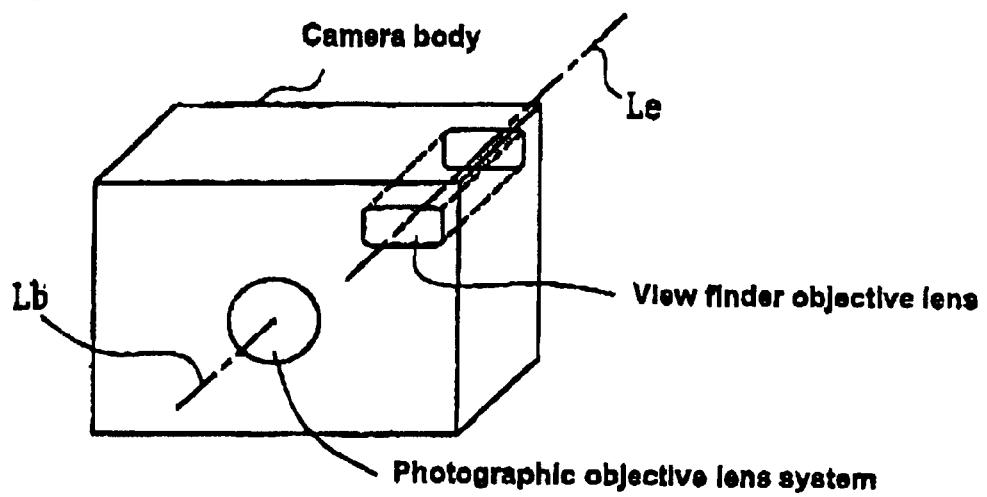
FIG. 25 schematically shows a perspective view of one example of a camera using a zoom optical system in accordance with the present invention.
Figure 26:
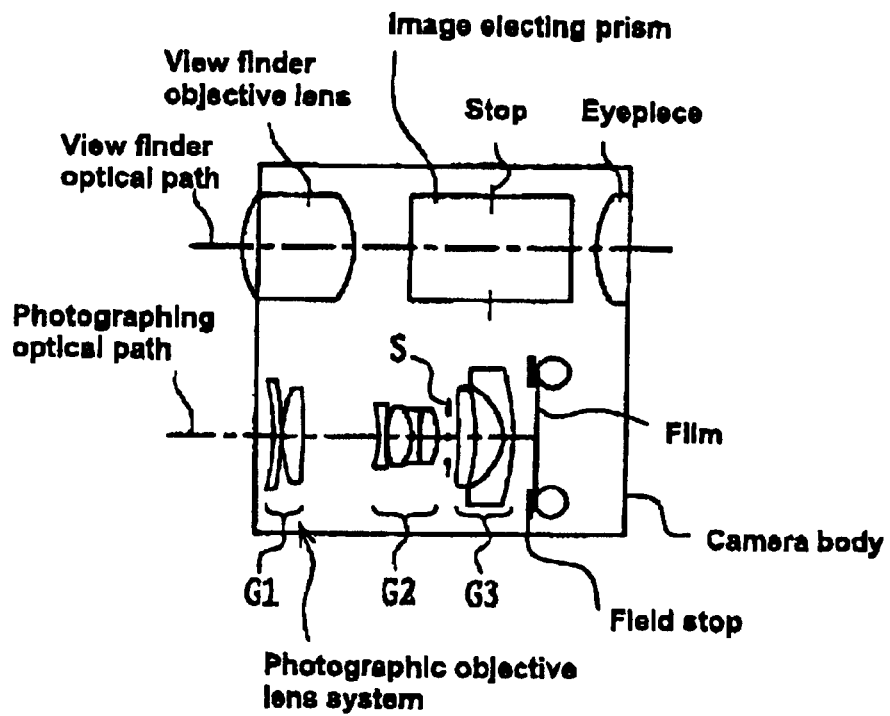
FIG. 26 schematically shows a cross-sectional view of an interior of the camera of FIG. 25.

Any one of the zoom optical systems in accordance with the embodiments of the present invention described above may be used as a photographic objective lens system a for a compact camera having a structure shows in a schematic perspective view in FIG. 25 and in a cross-sectional view in FIG. 26. The lens system shown in FIG. 26 includes a first lens unit G1 having positive refractive power, a second lens unit G2 having positive refractive power, and a third lens unit G3 having negative refractive power. The first lens unit G1, second lens unit G2 and third lens unit G3 compose a zoom optical system in accordance with the embodiments of the present invention described above. Also, in FIGS. 25 and 26, a reference symbol Lb indicates a photographing optical path, a reference symbol Le indicates a view finder optical path. The photographing optical path Lb and the view finder optical path Le are arranged in parallel with each other. An image of an object is observed through a view finder that is typically composed of a view finder objective lens, an image electing prism, a stop and an eyepiece, and imaged on a film by a photographic objective lens system a.

Figure 27:
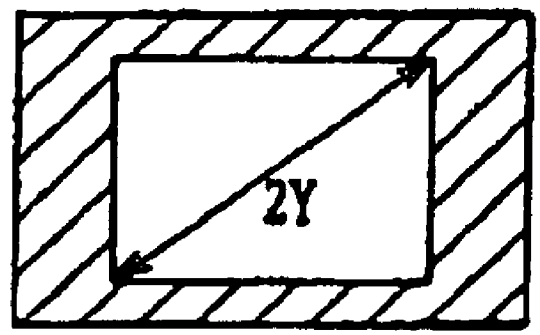
FIG. 27 is an illustration to describe a diagonal length of a field stop of the camera of FIG. 26.

A filed stop having a rectangular shaped aperture that defines an image area indicated in FIG. 27 may be disposed immediately before the film. A diagonal length of the filed stop is 2Y.

Instead of a film, an electronic image pickup device such as a CCD may be used. In other words, the zoom optical system of the present invention can be used as a photographic objective lens system of a compact electronic camera. In this case, a positive lens component may be disposed immediately before an image pickup surface of the electronic image pickup device such that axial and oblique principal rays incident on the electronic image pickup device are generally perpendicular to the image pickup surface. In this case, 2Y corresponds to a maximum diagonal length of an effective image pickup surface within effective imaging ranges of the electronic image pickup device.

As described above, in accordance with the present invention, miniaturization of an optical system can be achieved by shortening the total length of the lens system and reducing the diameter of the lens system. Moreover, zoom lens systems having an excellent imaging performance along the entire zooming range can be provided.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A zoom optical system comprising, in order from an object side:

a first lens unit having positive refractive power;

a second lens unit having positive refractive power; and a third lens unit having negative refractive power, wherein a magnification is changed from a wide-angle position to a telephoto position by moving the lens units toward the object side so as to widen an airspace between said first lens unit and said second lens unit and narrow an airspace between said second lens unit and said third lens unit, and wherein said zoom optical system satisfies the following conditions:

$0.5 < L_T/f_T < 0.8$ $0.5 < f_{G1}/f_W < 1.45$ $0.8 < f_{G2}/f_W < 1.2$ $0.4 < |f_{G3}/f_W| < 0.5$ where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, a reference symbol $f_{G2}$ represents a focal length of the second lens unit, and a reference symbol $f_{G3}$ represents a focal length of the third lens unit.

2. A zoom optical system comprising, in order from an object side:

a first lens unit having positive refractive power;

a second lens unit having positive refractive power;

a third lens unit having negative refractive power; and an aperture stop disposed on an image side of said second lens unit, wherein a magnification is changed from wide-angle position to a telephoto position by moving the lens units toward the object side so as to widen an airspace between said first lens unit and said second lens unit and narrow an airspace between said second lens unit and said third lens unit, and wherein said zoom optical system satisfies the following conditions:

$$0.5 < L_T/f_T < 0.8$$

$$0.5 < f_{G1}/f_W < 1.35$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, and a reference symbol $f_{G3}$ represents a focal length of the third lens unit.

3. A zoom optical system comprising, in order from an object side:
a first lens unit having positive refractive power;
a second lens unit having positive refractive power;
a third lens unit having negative refractive power; and
an aperture stop disposed on an image side of said second lens unit,
wherein a magnification is changed from a wide-angle position to a telephoto position by moving the lens units toward the object side so as to widen an airspace between said first lens unit and said second lens unit and narrow an airspace between said second lens unit and said third lens unit,
wherein said second lens unit comprises a bi-concave lens element disposed on the most object side and at least two positive lens elements, and said second lens unit comprises two lens components or three lens components in all the second lens unit, and
wherein said zoom optical system satisfies the following conditions:

$$0.5 < L_T/f_T < 0.8$$

$$0.2 < |f_{G3}/f_W| < 0.48$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, and a reference symbol $f_{G3}$ represents a focal length of the third lens unit.

4. A zoom optical system according to any one of claims 1–3, satisfying the following condition:

$$2.9 < f_T/f_W < 5.0$$

where the reference symbol $f_W$ represents a focal length of the zoom optical system at the wide-angle position, and the reference symbol $f_T$ represents a focal length of the zoom optical system at the telephoto position.

5. A camera comprising;
a photographic system including a zoom optical system; and
a field stop for determining an image area located on an image side of said zoom optical system,
wherein the zoom optical system comprises, in order from an object side:
a first lens unit having positive refractive power;
a second lens unit having positive refractive power; and
a third lens unit having negative refractive power,
wherein a magnification is changed from a wide-angle position to a telephoto position by moving the lens units toward the object side so as to widen an airspace between said first lens unit and said second lens unit and narrow an airspace between said second lens unit and said third lens unit, and wherein said zoom optical system satisfies the following conditions:

$$0.5 < L_T/f_T < 0.8$$

$$0.5 < f_{G1}/f_W < 1.45$$

$$0.8 < f_{G2}/f_W < 1.2$$

$$0.4 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, a reference symbol $f_{G2}$ represents a focal length of the second lens unit, and a reference symbol $f_{G3}$ represents a focal length of the third lens unit.

6. A camera according to claim 5, satisfying the following condition:

$$1.3 < f_W/Y < 2$$

where the reference symbol $f_W$ represents a focal length of the zoom optical system at the wide-angle position, and a reference symbol Y represents a maximum image height, but, when a shape of said field stop is variable, the maximum image height represents a maximum value in a range of variable image heights.

7. A camera comprising;
a photographic system including a zoom optical system; and
a field stop for determining an image area located on an image side of said zoom optical system,
wherein the zoom optical system comprises, in order from an object side:
a first lens unit having positive refractive power;
a second lens unit having positive refractive power;
a third lens unit having negative refractive power; and
an aperture stop disposed on an image side of said second lens unit,
wherein a magnification is changed from wide-angle position to a telephoto position by moving the lens units toward the object side so as to widen an airspace between said first lens unit and said second lens unit and narrow an airspace between said second lens unit and said third lens unit, and wherein said zoom optical system satisfies the following conditions:

$$0.5 < L_T/f_T < 0.8$$

$$0.5 < f_{G1}/f_W < 1.35$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, and a reference symbol $f_{G3}$ represents a focal length of the third lens unit.

8. A camera according to claim 7, satisfying the following condition:

$$1.3 < f_W/Y < 2$$

where the reference symbol $f_W$ represents a focal length of the zoom optical system at the wide-angle position, and a reference symbol Y represents a maximum image height, but, when a shape of said field stop is variable, the maximum image height represents a maximum value in a range of variable image heights.

9. A camera comprising;

a photographic system including a zoom optical system; and a field stop for determining an image area located on an image side of said zoom optical system, wherein a zoom optical system comprises, in order from an object side:

a first lens unit having positive refractive power;
a second lens unit having positive refractive power;
a third lens unit having negative refractive power; and
an aperture stop disposed on an image side of said second lens unit, wherein a magnification is changed from a wide-angle position to a telephoto position by moving the lens units toward the object side so as to widen an airspace between said first lens unit and said second lens unit and narrow an airspace between said second lens unit and said third lens unit, wherein said second lens unit comprises a bi-concave lens element disposed on the most object side and at least two positive lens elements, and said second lens unit comprises two lens components or three lens components in all the second lens unit, and wherein said zoom optical system satisfies the following conditions:

$$0.5 < L_T/f_T < 0.8$$

$$0.2 < |f_{G3}/f_W| < 0.48$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, and a reference symbol $f_{G3}$ represents a focal length of the third lens unit.

10. A camera according to claim 9, satisfying the following condition:

$$1.3 < f_W/Y < 2$$

where the reference symbol $f_W$ represents a focal length of the zoom optical system at the wide-angle position, and a reference symbol Y represents a maximum image height, but, when a shape of said field stop is variable, the maximum image height represents a maximum value in a range of variable image heights.

11. A zoom optical system according to claim 3, wherein said second lens unit comprises three lens components including, in order from the object side, a negative single lens component, a cemented lens component having a positive lens and a negative lens, and a positive single lens component.

12. A zoom optical system according to claim 3, wherein said second lens unit comprises three lens components including, in order from the object side, a negative single lens component, a positive single lens component, and a positive single lens component.

13. A zoom optical system according to claim 3, wherein said second lens unit comprises two lens components including, in order from the object side, a cemented lens component having a positive lens and a negative lens, and a positive single lens component.

14. A zoom optical system according to claim 3 or any one of claims 11–13, satisfying the following condition:

$$0.2 < |f_{G2N}|/f_W < 0.8$$

where the reference symbol $f_W$ represents a focal length of the zoom optical system at the wide-angle position, and a reference symbol $f_{G2N}$ represents a focal length of said bi-concave lens element disposed on the most object side in the second lens unit.

15. A zoom optical system according to claim 2, 3 or 11, satisfying the following condition:

$$0.8 < f_{G2}/f_W < 1.2$$

where the reference symbol $f_W$ represents a focal length of the zoom optical system at the wide-angle position, and a reference symbol $f_{G2}$ represents a focal length of said second lens unit.

16. A zoom optical system according to any one of claims 1–3 or 11–13, wherein said first lens unit comprises a negative meniscus lens element having a concave surface toward the object side and a bi-convex lens element.

17. A zoom optical system according to any one of claims 1–3, 11 or 12, wherein said first lens unit comprises, in order from the object side, a negative meniscus lens component having a concave surface toward the object side and a bi-convex lens component.

18. A zoom optical system comprising, in order from an object side:

a first lens unit having positive refractive power;
a second lens unit having positive refractive power; and a third lens unit having negative refractive power, wherein a magnification is changed from a wide-angle position to a telephoto position by moving the lens units toward the object side so as to widen an airspace between said first lens unit and said second lens unit and narrow an airspace between said second lens unit and said third lens unit, wherein said first lens unit comprises, in order from the object side, a negative meniscus lens component having a concave surface facing toward the object side and a bi-convex lens component, and wherein said zoom optical system satisfies the following conditions:

$$0.5 < L_T/f_T < 0.8$$

$$0.5 < f_{G1}/f_W < 1.5$$

$$0.8 < f_{G2}/f_W < 1.2$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, a reference symbol $f_{G2}$ represents a focal length of the second lens unit, and a reference symbol $f_{G3}$ represents a focal length of the third lens unit.

19. A zoom optical system comprising, in order from an object side:

a first lens unit having positive refractive power;

a second lens unit having positive refractive power;

a third lens unit having negative refractive power; and an aperture stop disposed on an image side of said second lens unit, wherein a magnification is changed from wide-angle position to a telephoto position by moving the lens units toward the object side so as to widen an airspace between said first lens unit and said second lens unit and narrow an airspace between said second lens unit and said third lens unit, wherein said first lens unit comprises, in order from the object side, a negative meniscus lens component having a concave surface facing toward the object side and a bi-convex lens component, and wherein said zoom optical system satisfies the following conditions:

$$0.5 < L_T/f_T < 0.8$$

$$0.5 < f_{G1}/f_W < 1.5$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, a reference symbol $f_{G1}$ represents a focal length of the first lens unit, and a reference symbol $f_{G3}$ represents a focal length of the third lens unit.

20. A zoom optical system comprising, in order from an object side:

a first lens unit having positive refractive power;

a second lens unit having positive refractive power;

a third lens unit having negative refractive power; and an aperture stop disposed on an image side of said second lens unit, wherein a magnification is changed from a wide-angle position to a telephoto position by moving the lens units toward the object side so as to widen an airspace between said first lens unit and said second lens unit and narrow an airspace between said second lens unit and said third lens unit, wherein said first lens unit comprises, in order from the object side, a negative meniscus lens component having a concave surface facing toward the object side and a bi-convex lens component, wherein said second lens unit comprises a bi-concave lens element disposed on the most object side and at least two positive lens elements, and said second lens unit comprises two lens components or three lens components in all the second lens unit, and wherein said zoom optical system satisfies the following conditions:

$$0.5 < L_T/f_T < 0.8$$

$$0.2 < |f_{G3}/f_W| < 0.5$$

where a reference symbol $f_W$ represents a focal length of the zoom optical system at the wide-angle position, a reference symbol $f_T$ represents a focal length of the zoom optical system at the telephoto position, a reference symbol $L_T$ represents a distance as measured from a most object side surface to an image surface on an optical axis at the telephoto position, and a reference symbol $f_{G3}$ represents a focal length of the third lens unit.

* * * * *